United States Patent
Li et al.

(10) Patent No.: US 10,693,614 B2
(45) Date of Patent: Jun. 23, 2020

(54) DATA TRANSMISSION METHOD, TERMINAL DEVICE, AND NETWORK DEVICE

(71) Applicant: Huawei Technologies Co., Ltd., Shenzhen (CN)

(72) Inventors: Chaojun Li, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/053,266

(22) Filed: Aug. 2, 2018

(65) Prior Publication Data
US 2018/0343099 A1 Nov. 29, 2018

Related U.S. Application Data

(63) Continuation of application No. PCT/CN2016/073335, filed on Feb. 3, 2016.

(51) Int. Cl.
*H04L 5/14* (2006.01)
*H04L 5/00* (2006.01)
(Continued)

(52) U.S. Cl.
CPC .......... *H04L 5/0055* (2013.01); *H04L 1/1812* (2013.01); *H04L 1/1825* (2013.01);
(Continued)

(58) Field of Classification Search
CPC ... H04L 5/0055; H04L 1/1812; H04L 1/1825; H04L 5/14; H04W 72/1273; H04W 28/04
See application file for complete search history.

(56) References Cited

U.S. PATENT DOCUMENTS

2014/0198737 A1  7/2014  Papasakellariou
2014/0269453 A1  9/2014  Papasakellariou
(Continued)

FOREIGN PATENT DOCUMENTS

CN  103354482 A  10/2013
CN  104518854 A   4/2015
(Continued)

OTHER PUBLICATIONS

3GPP, Nov. 2015, (Study on specification impact for downlink due to TTI shortening, 3GPP Draft; RI-156819).*
(Continued)

*Primary Examiner* — Lakeram Jangbahadur
(74) *Attorney, Agent, or Firm* — Leydig, Voit & Mayer, Ltd.

(57) ABSTRACT

A data transmission method, including: receiving, by a terminal device on a first time domain resource, at least one piece of downlink data sent by a network device; and sending receiving status information to the network device on a second time domain resource. A transmission time interval of any piece of downlink data is less than a transmission time interval of the receiving status information, and the transmission time interval of the any piece of downlink data is less than 1 ms. According to the data transmission method, a transmission time interval of downlink data and a time interval between a sending time of the receiving status information and a receiving time of the at least one piece of downlink data are shortened, thereby reducing a latency.

17 Claims, 13 Drawing Sheets

(51) Int. Cl.
*H04L 1/18* (2006.01)
*H04W 28/04* (2009.01)
*H04W 72/12* (2009.01)

(52) U.S. Cl.
CPC ............... *H04L 5/14* (2013.01); *H04W 28/04* (2013.01); *H04W 72/1273* (2013.01)

(56) References Cited

U.S. PATENT DOCUMENTS

| | | | |
|---|---|---|---|
| 2015/0085721 A1 | 3/2015 | Meng | |
| 2016/0226631 A1 | 8/2016 | Seo et al. | |
| 2017/0063516 A1* | 3/2017 | Miao | H04L 5/14 |
| 2018/0035329 A1* | 2/2018 | Futaki | H04W 28/06 |

FOREIGN PATENT DOCUMENTS

| | | |
|---|---|---|
| CN | 104519580 A | 4/2015 |
| CN | 104883744 A | 9/2015 |
| CN | 105009499 A | 10/2015 |
| EP | 1909410 A1 | 4/2008 |
| EP | 3012989 B1 | 5/2018 |
| WO | 2015050419 A1 | 4/2015 |
| WO | 2015172363 A1 | 11/2015 |

OTHER PUBLICATIONS

3GPP, May 2015, (Areas for reducing latency, 3GPP Draft; R2-152415, vol. RAN WG2).*

Intel (Discussion on TTI shortening—R1-156540), Nov. 2015, pp. 1-4.*

"Study on specification impact for downlink due to TTI shortening," 3GPP TSG RAN WG1 Meeing #83, Anaheim, USA, R1-156819,3rd Generation Partnership Project, Valbonne, France (Nov. 15-22, 2015).

"Areas for reducing latency," 3GPP TSG-RAN WG2 #90, Fukuoka, Japan, R2-152415,3rd Generation Partnership Project, Valbonne, France (May 25-29, 2015).

"Discussion on TTI Shortening," 3GPP TSG RAN WG1 Meeting #83, Anaheim, USA, R1-156540, pp. 1-4, 3rd Generation Partnership Project, Valbonne, France (Nov. 15-22, 2015).

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2016/073335, filed on Feb. 3, 2016, which is hereby incorporated by reference in its entirety.

TECHNICAL FIELD

The present disclosure relates to the field of wireless communications technologies, and in particular, to a data transmission method, a terminal device, and a network device.

BACKGROUND

In a Long Term Evolution (LTE) system, after receiving downlink data sent by a network device, a terminal device needs to send hybrid automatic repeat request-acknowledgement (HARQ-ACK) feedback information to the network device. If the downlink data is correctly received, the terminal device returns acknowledgement (ACK) information; if the downlink data is not correctly received, the terminal device returns non-acknowledgement (NACK) information. The HARQ-ACK feedback information may be carried on a physical uplink control channel (PUCCH) or a physical uplink shared channel (PUSCH).

In a wireless communications system, a latency is one of important factors affecting user experience. In addition, emerging of new services, such as a related service of the Internet of Vehicles, imposes an increasingly harsh requirement on a low latency. Therefore, in an existing LTE system, a transmission mechanism based on a one-subframe transmission time interval (TTI) cannot meet a demand for a low-latency service. How to reduce a latency becomes a problem to be resolved urgently.

SUMMARY

Embodiments of the present invention provide a data transmission method, a terminal device, and a network device, so as to reduce a latency in a communications system.

To resolve the foregoing technical problem, the embodiments of the present invention disclose the following technical solutions.

According to a first aspect, the present disclosure provides a data transmission method, including: receiving, by a terminal device, at least one piece of downlink data on a first time domain resource; and sending, by the terminal device, receiving status information on a second time domain resource, where the receiving status information is used to indicate a receiving status of the at least one piece of downlink data, a time interval between the second time domain resource and the first time domain resource is less than 4 milliseconds, a transmission time interval of the receiving status information is greater than a transmission time interval of any piece of downlink data in the at least one piece of downlink data, and the transmission time interval of the any piece of downlink data is less than 1 millisecond.

According to the data transmission method provided in the first aspect, a transmission time interval of downlink data and a time interval between a sending time of the receiving status information and a receiving time of the at least one piece of downlink data are shortened, thereby reducing a latency. In addition, a transmission time interval of uplink data is greater than the transmission time interval of downlink data. This enhances performance for receiving the receiving status information, and increases a probability that a network device correctly receives the receiving status information returned by the terminal device.

With reference to the first aspect, in a first possible implementation of the first aspect, a length of the transmission time interval of the any piece of downlink data in the at least one piece of downlink data is 4 symbols or 3 symbols, and the transmission time interval of the receiving status information is 0.5 ms; and the first time domain resource is a timeslot n−2 or a timeslot n−3 and the second time domain resource is a timeslot n, where the timeslot n−2 is a second timeslot counted backward from the timeslot n, and the timeslot n−3 is a third timeslot counted backward from the timeslot n.

With reference to the first aspect, in a second possible implementation of the first aspect, a length of the transmission time interval of the any piece of downlink data in the at least one piece of downlink data is 2 symbols or 1 symbol, and the transmission time interval of the receiving status information is 0.5 ms; and the first time domain resource is a timeslot n−2 and the second time domain resource is a timeslot n, where the timeslot n−2 is a second timeslot counted backward from the timeslot n.

With reference to the first aspect or the second possible implementation of the first aspect, in a third possible implementation of the first aspect, the method further includes: if the terminal device fails to receive one or more pieces of downlink data in the at least one piece of downlink data on the first time domain resource, receiving, by the terminal device, the retransmitted one or more pieces of downlink data on a third time domain resource, where the third time domain resource is a timeslot n+2 or a timeslot n+3, the timeslot n+2 is a second timeslot counted forward from the timeslot n, and the timeslot n+3 is a third timeslot counted forward from the timeslot n.

With reference to the first aspect, in a fourth possible implementation of the first aspect, the transmission time interval of the any piece of downlink data in the at least one piece of downlink data is 0.5 ms, and the transmission time interval of the receiving status information is 1 ms; and the first time domain resource is a subframe n−2 or a subframe n−3 and the second time domain resource is a subframe n, where the subframe n−2 is a second subframe counted backward from the subframe n, and the subframe n−3 is a third subframe counted backward from the subframe n.

With reference to the fourth possible implementation of the first aspect, in a fifth possible implementation of the first aspect, the method further includes: if the terminal device fails to receive one or more pieces of downlink data in the at least one piece of downlink data on the first time domain resource, receiving, by the terminal device, the retransmitted one or more pieces of downlink data on a third time domain resource, where the third time domain resource is a subframe n+2 or a subframe n+3, the subframe n+2 is a second subframe counted forward from the subframe n, and the subframe n+3 is a third subframe counted forward from the subframe n.

With reference to any one of the first aspect, or the first to the third possible implementations of the first aspect, in a sixth possible implementation of the first aspect, the receiving status information is carried on a physical uplink control channel PUCCH, and the transmission time interval of the receiving status information is 0.5 ms; and the sending, by the terminal device, receiving status information on a second time domain resource includes: sending, by the terminal device, a PUCCH demodulation reference signal DMRS in the first N successive symbols of the second time domain resource, and sending the PUCCH in 7-N symbols or 6-N symbols of the second time domain resource, where N is 1, 2, or 3.

With reference to any one of the first aspect, or the first to the third possible implementations of the first aspect, in a seventh possible implementation of the first aspect, the receiving status information is carried on a PUCCH, the transmission time interval of the receiving status information is 0.5 ms, the PUCCH includes a first PUCCH and a second PUCCH, and a PUCCH DMRS includes a first PUCCH DMRS and a second PUCCH DMRS; and the sending, by the terminal device, receiving status information on a second time domain resource includes: sending, by the terminal device, the first PUCCH and the first PUCCH DMRS in the first M1 symbols of the second time domain resource, where the first PUCCH and the first PUCCH DMRS occupy a first frequency domain resource in a frequency domain; and sending, by the terminal device, the second PUCCH and the second PUCCH DMRS in the last M2 symbols of the second time domain resource, where the second PUCCH and the second PUCCH DMRS occupy a second frequency domain resource in the frequency domain, and if each timeslot includes 7 symbols, M1 is 3 and M2 is 4, or M1 is 4 and M2 is 3.

According to a second aspect, the present disclosure provides a data transmission method, including: sending, by a network device, at least one piece of downlink data on a first time domain resource; and receiving, by the network device, receiving status information on a second time domain resource, where the receiving status information is used to indicate a receiving status of the at least one piece of downlink data, a transmission time interval of the receiving status information is greater than a transmission time interval of any piece of downlink data in the at least one piece of downlink data, the transmission time interval of the any piece of downlink data is less than 1 millisecond, and a time interval between the second time domain resource and the first time domain resource is less than 4 milliseconds.

According to the data transmission method provided in the second aspect, a transmission time interval of downlink data and a time interval between a sending time of the receiving status information and a receiving time of the at least one piece of downlink data are shortened, thereby reducing a latency. In addition, a transmission time interval of uplink data is greater than the transmission time interval of downlink data. This enhances performance for receiving the receiving status information, and increases a probability that the network device correctly receives the receiving status information returned by a terminal device.

With reference to the second aspect, in a first possible implementation of the second aspect, a length of the transmission time interval of the any piece of downlink data in the at least one piece of downlink data is 4 symbols or 3 symbols, and the transmission time interval of the receiving status information is 0.5 ms; and the first time domain resource is a timeslot n−2 or a timeslot n−3 and the second time domain resource is a timeslot n, where the timeslot n−2 is a second timeslot counted backward from the timeslot n, and the timeslot n−3 is a third timeslot counted backward from the timeslot n.

With reference to the second aspect, in a second possible implementation of the second aspect, a length of the transmission time interval of the any piece of downlink data in the at least one piece of downlink data is 2 symbols or 1 symbol, and the transmission time interval of the receiving status information is 0.5 ms; and the first time domain resource is a timeslot n−2 and the second time domain resource is a timeslot n, where the timeslot n−2 is a second timeslot counted backward from the timeslot n.

With reference to the first or the second possible implementation of the second aspect, in a third possible implementation of the second aspect, the method further includes: if the receiving status information indicates that one or more pieces of downlink data in the at least one piece of downlink data fail to be received, retransmitting, by the network device, the one or more pieces of downlink data on a third time domain resource, where the third time domain resource is a timeslot n+2 or a timeslot n+3, the timeslot n+2 is a second timeslot counted forward from the timeslot n, and the timeslot n+3 is a third timeslot counted forward from the timeslot n.

With reference to the second aspect, in a fourth possible implementation of the second aspect, the transmission time interval of the any piece of downlink data in the at least one piece of downlink data is 0.5 ms, and the transmission time interval of the receiving status information is 1 ms; and the first time domain resource is a subframe n−2 or a subframe n−3 and the second time domain resource is a subframe n, where the subframe n−2 is a second subframe counted backward from the subframe n, and the subframe n−3 is a third subframe counted backward from the subframe n.

With reference to the fourth possible implementation of the second aspect, in a fifth possible implementation of the second aspect, the method further includes: if the receiving status information indicates that one or more pieces of downlink data in the at least one piece of downlink data fail to be received, retransmitting, by the network device, the one or more pieces of downlink data on a third time domain resource, where the third time domain resource is a subframe n+2 or a subframe n+3, the subframe n+2 is a second subframe counted forward from the subframe n, and the subframe n+3 is a third subframe counted forward from the subframe n.

With reference to any one of the second aspect, or the first to the third possible implementations of the second aspect, in a sixth possible implementation of the second aspect, the receiving status information is carried on a physical uplink control channel PUCCH, and the transmission time interval of the receiving status information is 0.5 ms; and the receiving, by the network device, the receiving status information on a second time domain resource includes: receiving, by the network device, a PUCCH demodulation reference signal DMRS in the first N successive symbols of the second time domain resource, and receiving the PUCCH in 7-N symbols or 6-N symbols of the second time domain resource, where N is 1, 2, or 3.

With reference to any one of the second aspect, or the first to the third possible implementations of the second aspect, in a seventh possible implementation of the second aspect, the receiving status information is carried on a PUCCH, the transmission time interval of the receiving status information is 0.5 ms, the PUCCH includes a first PUCCH and a second PUCCH, and a PUCCH DMRS includes a first PUCCH DMRS and a second PUCCH DMRS; and the receiving, by the network device, the receiving status information on a second time domain resource includes: receiving, by the network device, the first PUCCH and the first PUCCH DMRS in the first M1 symbols of the second time domain resource, where the first PUCCH and the first PUCCH DMRS occupy a first frequency domain resource in a frequency domain; and receiving, by the network device, the second PUCCH and the second PUCCH DMRS in the last M2 symbols of the second time domain resource, where the second PUCCH and the second PUCCH DMRS occupy a second frequency domain resource in the frequency domain, and if each timeslot includes 7 symbols, M1 is 3 and M2 is 4, or M1 is 4 and M2 is 3.

According to a third aspect, the present disclosure provides a terminal device, including a receiver and a transmitter. The terminal device is configured to perform the data transmission method provided in the implementations of the first aspect.

According to a fourth aspect, the present disclosure provides a network device, including a transmitter and a receiver. The network device is configured to perform the data transmission method provided in the implementations of the second aspect.

It can be learned from the foregoing technical solutions that, according to the data transmission method provided in the embodiments of the present invention, the terminal device receives, on the first time domain resource, the at least one piece of downlink data sent by the network device; and then sends the receiving status information to the network device on the second time domain resource. The transmission time interval of the any piece of downlink data is less than the transmission time interval of the receiving status information, and the transmission time interval of the any piece of downlink data is less than 1 ms. In addition, the time interval between the second time domain resource and the first time domain resource is less than 4 ms. According to the data transmission method, a transmission time interval of downlink data and a time interval between a sending time of the receiving status information and a receiving time of the at least one piece of downlink data are shortened, thereby reducing a latency. In addition, a transmission time interval of uplink data is greater than the transmission time interval of downlink data. This enhances performance for receiving the receiving status information, and increases a probability that the network device correctly receives the receiving status information returned by the terminal device.

BRIEF DESCRIPTION OF DRAWINGS

The accompanying drawings in the specification that are a part of this application are used for further understanding of the present disclosure. Example embodiments in the present invention and descriptions thereof are intended to interpret the present disclosure and do not constitute any inappropriate limitation to the present disclosure.

To describe the technical solutions in the embodiments of the present invention more clearly, the following briefly describes the accompanying drawings required for describing the embodiments or the prior art. A person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
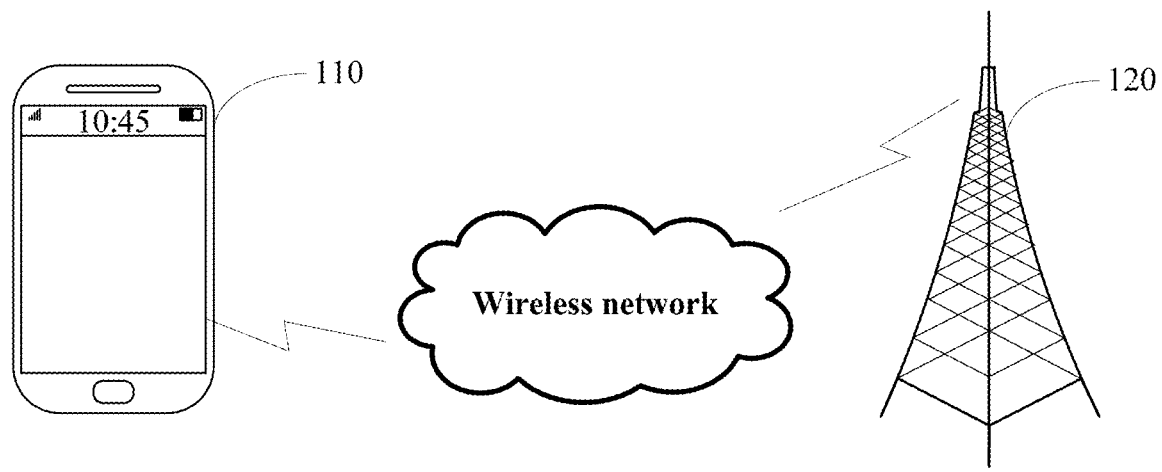
FIG. 1 is a schematic diagram of a wireless communications network system according to an embodiment of the present invention.

Referring to FIG. 1, FIG. 1 is a schematic diagram of a wireless communications network system according to an embodiment of the present invention. The wireless communications network system includes a terminal device 110 and a network device 120.

The terminal device 110 mentioned in this embodiment of the present invention may be a device that provides a user with voice and/or data connectivity, a handheld device with a wireless connection function, or another processing device connected to a wireless modem. The terminal device may communicate with one or more core networks through a radio access network (RAN). The terminal device may be a mobile terminal, such as a mobile phone (also referred to as a "cellular" phone) or a computer with a mobile terminal, for example, may be a portable, a pocket-sized, a handheld, a computer built-in, or an in-vehicle mobile apparatus, which exchanges voice and/or data with the radio access network. For example, the terminal device may be a device such as a personal communications service (PCS) phone, a cordless telephone set, a Session Initiation Protocol (SIP) phone, a wireless local loop (WLL) station, or a personal digital assistant (PDA). A terminal device may also be referred to as a system, a subscriber unit, a subscriber station, a mobile station, a remote station, an access point, a remote terminal, an access terminal, a user terminal, a user agent, a user device, or user equipment.

The network device 120 mentioned in this embodiment of the present invention may be a base station or an access point, or may be a device in communication with a wireless terminal via one or more sectors at an air interface in an access network. The base station may be configured to mutually convert a received over-the-air frame and an IP packet and serve as a router between the wireless terminal and a rest portion of the access network, and the rest portion of the access network may include an Internet Protocol (IP) network. The base station may further coordinate attribute management of the air interface. For example, the base station may be a base transceiver station (BTS) in GSM or CDMA, may be a NodeB in WCDMA, or may be an evolved NodeB (eNB) in LTE. This is not limited in the present invention.

The wireless communications system can be applied to 4.5G (the $4.5^{th}$ generation mobile communications), 5G (the $5^{th}$ generation mobile communications), and more advanced communications technologies.

Data sent by the terminal device 110 to the network device 120 is referred to as uplink data; and data sent by the network device 120 to the terminal device 110 is referred to as downlink data.

In this embodiment, an LTE-based wireless communications system is used as an example for description. It should be noted that this embodiment of the present invention can be applied to any wireless communications system in which data transmission is performed through scheduling, and is not limited to an LTE system.

In the LTE system, each radio frame consists of 10 subframes that are 1 ms in length, and numbers of the subframes are 0 to 9. A subframe n−a is an $a^{th}$ subframe previous to a subframe n, in other words, the subframe n−a is the $a^{th}$ subframe counted backward from the subframe n. For example, if n=4 and a=2, the subframe n−a is a subframe 2 in a radio frame to which the subframe n belongs. For another example, if n=0 and a=2, the subframe n−a is a subframe 8 in a radio frame previous to a radio frame to which the subframe n belongs. A subframe n+a is an $a^{th}$ subframe next to the subframe n, in other words, the subframe n+a is the $a^{th}$ subframe counted forward from the subframe n. For example, if n=4 and a=3, the subframe n+a is a subframe 7 in a radio frame to which the subframe n belongs. For another example, if n=8 and a=2, the subframe n+a is a subframe 0 in a radio frame next to a radio frame to which the subframe n belongs.

In the LTE system, each subframe includes 2 timeslots (also refer as slot), that is, each radio frame includes 20 timeslots, and numbers of the timeslots are 0 to 19. A timeslot n−a is an $a^{th}$ timeslot previous to a timeslot n, in other words, the timeslot n−a is the $a^{th}$ timeslot counted backward from the timeslot n. For example, if n=4 and a=2, the timeslot n−a is a timeslot 2 in a radio frame to which the timeslot n belongs. For example, if n=0 and a=2, the timeslot n−a is a timeslot 18 in a radio frame previous to a radio frame to which the timeslot n belongs. A timeslot n+a is an $a^{th}$ timeslot next to the timeslot n, in other words, the timeslot n+a is the $a^{th}$ timeslot counted forward from the timeslot n. For example, if n=4 and a=3, the timeslot n+4 is a timeslot 7 in a radio frame to which the timeslot n belongs. For example, if n=18 and a=2, the timeslot n+2 is a timeslot 0 in a radio frame next to a radio frame to which the timeslot n belongs.

For a normal cyclic prefix (normal CP), each subframe consists of 14 symbols, that is, each subframe consists of symbols with sequence numbers {#0, #1, #2, #3, #4, #5, #6, #7, #8, #9, #10, #11, #12, #13}. For an extended cyclic prefix (extended CP), each subframe consists of 12 symbols, that is, each subframe consists of symbols with sequence numbers {#0, #1, #2, #3, #4, #5, #6, #7, #8, #9, #10, #11}.

In this embodiment of the present invention, both an uplink symbol and a downlink symbol are referred to as a symbol for short. The uplink symbol is referred to as a single carrier frequency division multiple access (SC-FDMA) symbol. The downlink symbol is referred to as an orthogonal frequency division multiplexing (OFDM) symbol. It should be noted that, if an uplink multiple access manner of orthogonal frequency division multiple access (OFDMA) is introduced in a subsequent technology, the uplink symbol may also be referred to as an OFDM symbol. No limitation is imposed on an uplink multiple access manner and a downlink multiple access manner in the present disclosure.

In the LTE system, after receiving downlink data sent by the network device 120, the terminal device 110 needs to send receiving status information to the network device 120, so that the network device 120 learns of a status of receiving the downlink data by the terminal device 110. To meet a demand for a low-latency service, a short-TTI data transmission mechanism is introduced, that is, a TTI of downlink data is shortened. In addition, to reduce a performance loss of the receiving status information, a TTI of the receiving status information is controlled to be greater than the TTI of the downlink data.

In an existing LTE system, a time domain resource occupied for transmitting data whose TTI length is 1 ms is equal to or less than 1 ms. For example, the first 1, 2, 3, or 4 symbols in a downlink subframe are used to transmit a PDCCH and other symbols in the subframe are used to transmit downlink data. Therefore, a time domain resource occupied for transmitting downlink data whose TTI is 1 ms is less than 1 ms. For example, a last symbol in an uplink subframe is used to transmit a sounding reference signal (SRS). Therefore, a time domain resource actually occupied for transmitting uplink data whose TTI length is 1 ms is less than 1 ms.

A short TTI is a TTI whose TTI length is less than 1 ms, such as, 0.5 ms, a length of 4 symbols, a length of 3 symbols, a length of 2 symbols, or a length of 1 symbol. Similarly, a time domain resource occupied for transmitting uplink data or downlink data whose TTI length is short may be equal to or less than the short TTI length.

Figure 2:
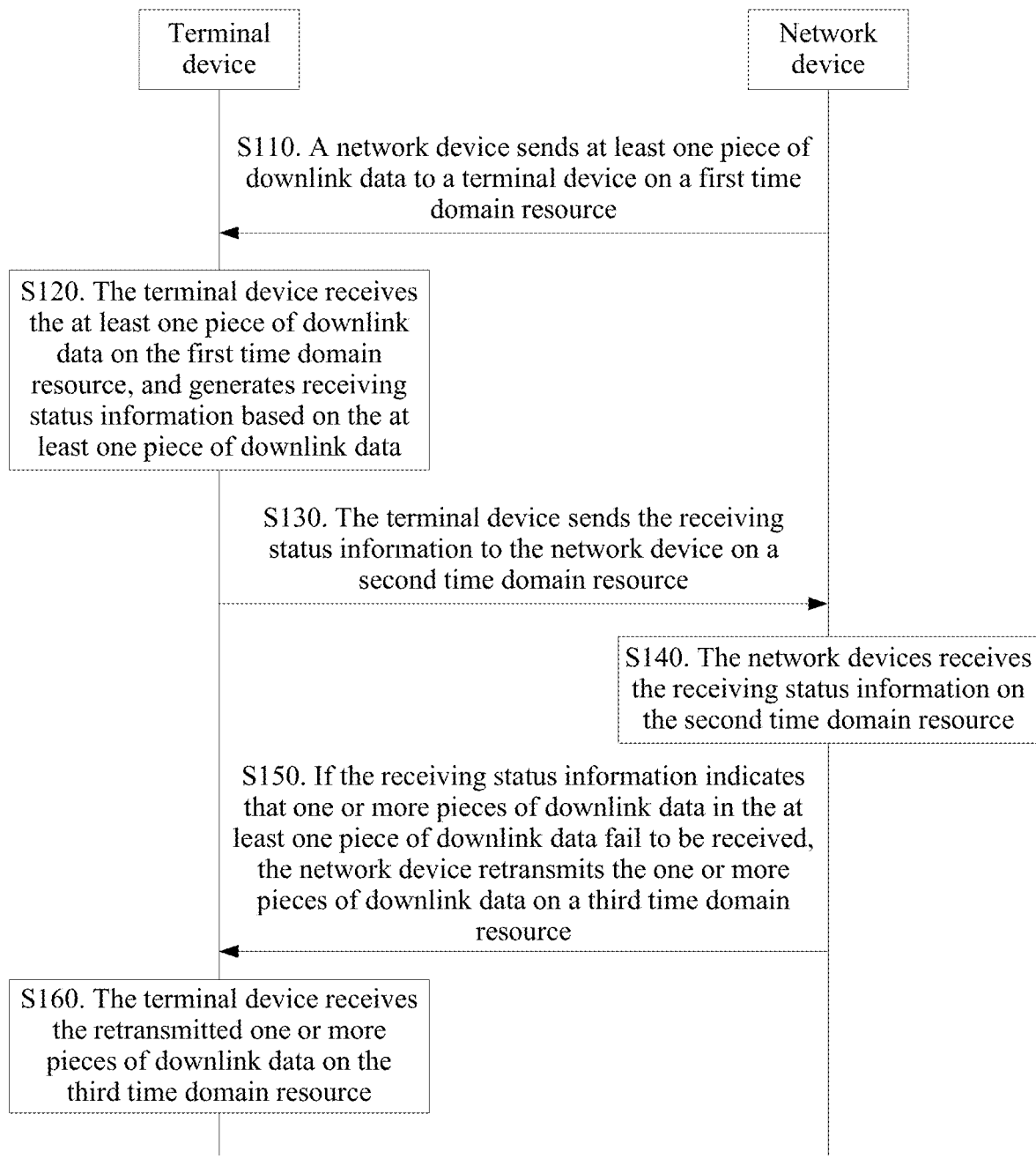
FIG. 2 is a flowchart of a data transmission method according to an embodiment of the present invention.

Referring to FIG. 2, FIG. 2 is a flowchart of a data transmission method according to an embodiment of the present invention. The method is applied to the wireless communications system shown in FIG. 1. As shown in FIG. 2, the method includes the following steps.

S110. A network device sends at least one piece of downlink data on a first time domain resource.

Correspondingly, a terminal device receives, on the first time domain resource, the at least one piece of downlink data sent by the network device.

The downlink data may be data carried on a physical downlink shared channel (PDSCH) or downlink semi-persistent scheduling (SPS) release signaling.

S120. A terminal device receives the at least one piece of downlink data on the first time domain resource, and generates receiving status information based on a receiving status of the received at least one piece of downlink data.

After receiving the at least one piece of downlink data, the terminal device needs to determine whether the at least one piece of downlink data is correctly received, and then feeds back the receiving status, namely, a receiving result, to the network device. In this embodiment of the present invention, the receiving status information is used to indicate the receiving status of the at least one piece of downlink data. The receiving status information may also be referred to as HARQ-ACK feedback information, HARQ-ACK information for short. The receiving status information may be carried on a PUCCH or a PUSCH, that is, the receiving status information is a type of uplink data that is carried on the PUCCH or the PUSCH.

The HARQ-ACK information includes an ACK, a NACK, and/or discontinuous transmission (DTX). The ACK indicates that the receiving is correct, the NACK indicates that the receiving is incorrect, and the DTX indicates that no downlink data is received. For example, when the downlink data is the data carried on the PDSCH, the receiving status information may include the ACK and the NACK; or the receiving status information may include the ACK, the NACK, and the DTX. The DTX indicates that no downlink data is received. For example, when the downlink data is the SPS release signaling, and if the terminal device detects the SPS release signaling sent by the network device, the receiving status information is the ACK; if the terminal device does not detect the SPS release signaling sent by the network device, the receiving status information is the DTX. Optionally, when determining that the receiving status of the downlink data is the DTX, the terminal device may not send the receiving status information of the downlink data to the network device.

Optionally, that the terminal device generates receiving status information based on a receiving status of the received at least one piece of downlink data includes: determining, by the terminal device, receiving statuses of all downlink data in the at least one piece of downlink data, and generates the receiving status information based on the receiving statuses of all the downlink data.

Optionally, that the terminal device generates receiving status information based on a receiving status of the received at least one piece of downlink data includes: performing, by the terminal device, an AND logical operation on receiving statuses of all downlink data in the received at least one piece of downlink data, and then obtaining the receiving status information. The receiving status information indicates that the receiving fails once one piece of the at least one piece of downlink data fails to be received; and the receiving status information indicates that the receiving succeeds provided that all the downlink data is received successfully.

Optionally, that the terminal device generates receiving status information based on a receiving status of the received at least one piece of downlink data includes: generating, by the terminal device, the receiving status information based on receiving statuses of all downlink data in the received at least one piece of downlink data, and selecting a PUCCH resource for carrying the receiving status information from a plurality of PUCCH resources, where the receiving status information and the PUCCH resource jointly indicate the receiving status of the at least one piece of downlink data.

Optionally, that the terminal device generates receiving status information based on a receiving status of the received at least one piece of downlink data includes: generating, by the terminal device, the receiving status information based on receiving statuses of all downlink data in the received at least one piece of downlink data, where the generated receiving status information includes a plurality of information fields, and information in different information fields is used to indicate receiving statuses of different downlink data in the at least one piece of downlink data.

It should be noted that how the receiving status information is generated is not limited in the present disclosure, and the foregoing solutions are optional solutions. In addition, how a receiving status of downlink data is determined is not limited in the present disclosure neither, and any manner in which whether downlink data is successfully received by a receiver or not can be determined can be applied in the present disclosure.

S130. The terminal device sends the receiving status information on a second time domain resource.

A transmission time interval of the receiving status information is greater than a transmission time interval of any piece of downlink data in the at least one piece of downlink data, and the transmission time interval of the any piece of downlink data is less than 1 ms. In addition, a time interval between the second time domain resource and the first time domain resource is less than 4 ms. A time length of the second time domain resource is equal to the transmission time interval of the receiving status information. A time length of the first time domain resource is greater than the transmission time interval of the any piece of downlink data. Therefore, the terminal device can receive, on the first time domain resource, the at least one piece of downlink data (in other words, one or more pieces of downlink data) sent by the network device, and different downlink data in the at least one piece of downlink data is located in different symbols.

In the following two optional solutions, the time length of the second time domain resource is equal to the transmission time interval of the receiving status information.

Optional solution 1: The receiving status information sent by the terminal device is carried on the PUCCH, and a time length of a time domain resource occupied by the PUCCH and a PUCCH demodulation reference signal (DMRS) together is equal to the time length of the second time domain resource.

Optional solution 2: The receiving status information sent by the terminal device is carried on the PUCCH, and a time length of a time domain resource occupied by the PUCCH is equal to the time length of the second time domain resource. That is, a time length of a time domain resource occupied by the PUCCH and a PUCCH DMRS together is greater than the time length of the second time domain resource. The PUCCH DMRS is previous to the PUCCH. For example, when the time length of the second time domain resource is 2 symbols, the PUCCH occupies 2 symbols, and the PUCCH DMRS occupies 1 or 2 symbols, the PUCCH and the PUCCH DMRS occupy 3 or 4 symbols together, greater than the time length of the second time domain resource. In this case, the PUCCH DMRS of the terminal device (referred to as a first terminal device) may overlap with a PUCCH of a second terminal device in a time domain, and then code division is performed (for example, by using different cyclic shifts or orthogonal spreading code). Similarly, the PUCCH of the terminal device may overlap with a PUCCH DMRS of a third terminal device in the time domain, and then code division is performed. The first terminal device, the second terminal device, and the third terminal device are different terminal devices.

To reduce a latency, not only a TTI length needs to be shortened, but also a time interval between a receiving time of downlink data and a sending time of HARQ-ACK feedback information needs to be reduced. In an existing frequency division duplexing (FDD) system, the time interval between a receiving time of downlink data and a sending time of HARQ-ACK feedback information is 4 ms. For example, a TTI length of uplink/downlink data may be shortened to a length of 0.5 ms, 4 symbols, 3 symbols, 2 symbols, or 1 symbol. However, performance for receiving uplink data is affected after a TTI of the uplink data is shortened.

To enhance performance for receiving the receiving status information (namely, uplink data), a TTI length of the receiving status information is set to greater than a TTI length of downlink data. For example, the TTI length of the receiving status information is 0.5 ms or 1 ms, and the TTI length of downlink data may be 1, 2, 3, or 4 symbols. For example, the TTI length of the receiving status information is 3 or 4 symbols, and the TTI length of downlink data is 1 or 2 symbols. For another example, the TTI length of the receiving status information is 1 ms, and the TTI length of downlink data is 0.5 ms.

A prior-art hybrid automatic repeat request (HARQ) time sequence cannot meet a demand for inequality between the TTI length of the uplink receiving status information and the TTI length of downlink data. Therefore, the HARQ time sequence needs to be redefined. The HARQ time sequence is a transmission time sequence between downlink data and receiving status information (namely, HARQ-ACK feedback information). The HARQ time sequence is redefined, so that the time interval between a receiving time of downlink data and a sending time of HARQ-ACK feedback information is less than 4 ms.

S140. The network device receives the receiving status information on the second time domain resource.

Specifically, the network device receives, on the second time domain resource, the receiving status information sent by the terminal device.

Optionally, the flowchart of the data transmission method shown in FIG. 2 may further include the following steps after step S140.

S150. If the receiving status information indicates that one or more pieces of downlink data in the at least one piece of downlink data fail to be received, the network device retransmits the one or more pieces of downlink data on a third time domain resource. A time interval between the third time domain resource and the first time domain resource is less than 8 ms.

The time interval between the third time domain resource and the first time domain resource is a HARQ round-trip time (RTT). The HARQ RTT is a minimum time interval between a retransmitted data packet and an initially transmitted data packet. In the existing FDD system, the minimum time interval between a retransmitted data packet and an initially transmitted data packet is 8 ms. The latency can be further reduced by shortening the HARQ RTT.

S160. The terminal device receives the retransmitted one or more pieces of downlink data on the third time domain resource.

Specifically, if the terminal device fails to receive the one or more pieces of downlink data in the at least one piece of downlink data on the first time domain resource, the terminal device receives, on the third time domain resource, the one or more pieces of downlink data that are retransmitted by the network device.

It should be noted that step S120 and step S130 in this embodiment may be applied to a terminal device, that is, step S120 and step S130 are used as an invention embodiment of a terminal device side and are not limited by an operation of a network device side. In this way, this embodiment may include the following steps:

S120. The terminal device receives at least one piece of downlink data on a first time domain resource.

S130. The terminal device sends receiving status information on a second time domain resource.

Optionally, step S160 may further be included. If the terminal device fails to receive one or more pieces of downlink data in the at least one piece of downlink data on the first time domain resource, the terminal device receives the retransmitted one or more pieces of downlink data on a third time domain resource.

Similarly, step S110 and step S140 in this embodiment may be applied to a network device, that is, step S110 and step S140 are used as an invention embodiment of a network device side and are not limited by an operation of a terminal device side. In this way, this embodiment may include the following steps:

S110. The network device sends at least one piece of downlink data on a first time domain resource.

S140. The network device receives receiving status information on a second time domain resource.

Optionally, step S150 may further be included. If the receiving status information indicates that one or more pieces of downlink data in the at least one piece of downlink data fail to be received, the network device retransmits the one or more pieces of downlink data on a third time domain resource.

According to the data transmission method provided in this embodiment, the terminal device receives the at least one piece of downlink data on the first time domain resource; and then sends the receiving status information on the second time domain resource. The time interval between the second time domain resource and the first time domain resource is less than 4 ms, the transmission time interval of the any piece of downlink data is less than the transmission time interval of the receiving status information, and the transmission interval of the any piece of downlink data is less than 1 ms. According to the data transmission method, a transmission time interval of downlink data and a time interval between a sending time of the receiving status information and a receiving time of the at least one piece of downlink data are shortened, thereby reducing a latency. In addition, the transmission time interval of the receiving status information (namely, uplink data) is greater than the transmission time interval of downlink data. This enhances performance for receiving the receiving status information, and increases a probability that the network device correctly receives the receiving status information returned by the terminal device. In addition, according to the data transmission method, on a premise that the TTI of downlink data and the time interval between a receiving time of the at least one piece of downlink data and a sending time of the receiving status information are shortened, the HARQ RTT is reduced, and the latency is further reduced effectively.

A HARQ time sequence is described in detail in the following embodiments corresponding to FIG. 3 to FIG. 12.

Optionally, before sending at least one piece of downlink data to a terminal device on a first time domain resource, a network device sends signaling to the terminal device. Correspondingly, before receiving the at least one piece of downlink data on the first time domain resource, the terminal device receives the signaling sent by the network device. The signaling is used to indicate a time interval between a second time domain resource and a first time domain resource, and/or a time interval between a second time domain resource and a third time domain resource, and/or a time interval between a third time domain resource and a first time domain resource.

Figure 3:
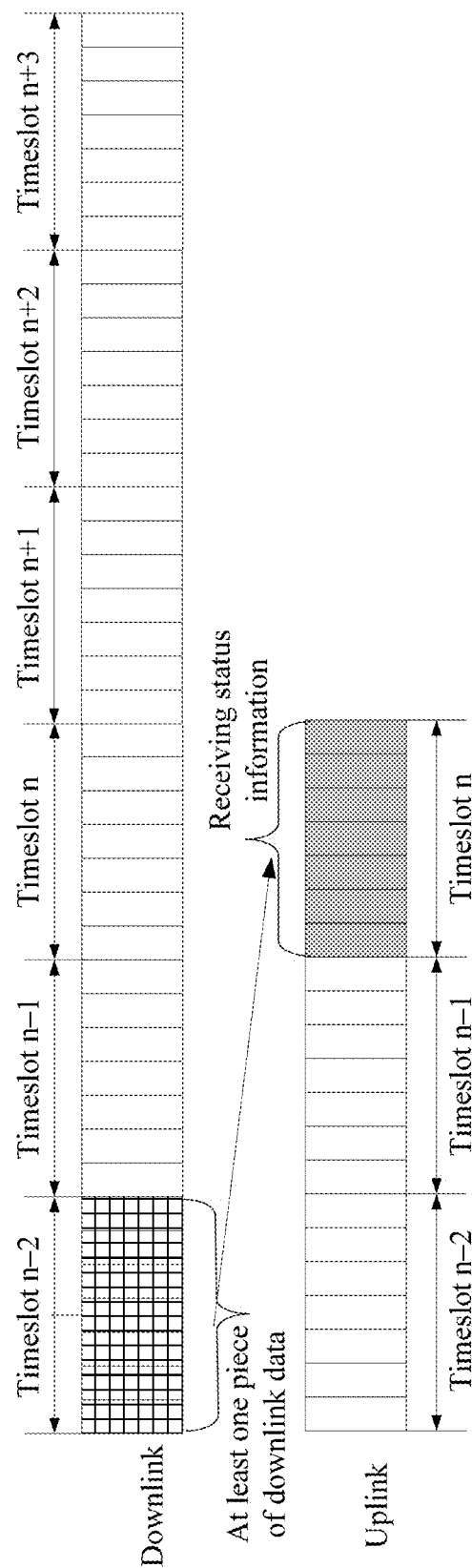
FIG. 3 is a schematic diagram of a HARQ time sequence according to an embodiment of the present invention.

Referring to FIG. 3, FIG. 3 is a schematic diagram of a HARQ time sequence according to an embodiment of the present invention. In this embodiment, a TTI length of receiving status information is 0.5 ms (namely, one timeslot), and a TTI length of any piece of downlink data in at least one piece of downlink data is 4 symbols or 3 symbols.

A first time domain resource is a timeslot n−2 (as shown in FIG. 3) or a timeslot n−3, and a second time domain resource is a timeslot n. The timeslot n−2 is a second timeslot previous to the timeslot n, and the timeslot n−3 is a third timeslot previous to the timeslot n.

A timeslot includes 7 or 6 symbols and the TTI length of the any piece of downlink data is 4 symbols or 3 symbols. Therefore, the first time domain resource can accommodate two pieces of downlink data at most. For example, the at least one piece of downlink data includes one piece of downlink data whose TTI length is 4 symbols and/or one piece of downlink data whose TTI length is 3 symbols. For example, the at least one piece of downlink data includes one or two pieces of downlink data whose TTI is 3 symbols.

A network device sends the at least one piece of downlink data to a terminal device in the timeslot n−2 or the timeslot n−3; correspondingly, the terminal device receives, in the timeslot n−2 or the timeslot n−3, the at least one piece of downlink data sent by the network device. Then, the terminal device sends the receiving status information to the network device in the timeslot n; correspondingly, the network device receives, in the timeslot n, the receiving status information sent by the terminal device.

In this embodiment, if the first time domain resource is the timeslot n−2, a time interval between a receiving time of the downlink data (the timeslot n−2) and a sending time of the receiving status information (the timeslot n) (namely, a time interval between the first time domain resource and the second time domain resource) is less than or equal to 1 ms (a length of 2 timeslots). If the first time domain resource is the timeslot n−3, a time interval between a receiving time of the downlink data (the timeslot n−3) and a sending time of the receiving status information (the timeslot n) is less than or equal to 1.5 ms (a length of 3 timeslots). Therefore, after this embodiment is used, the time interval between a receiving time of the downlink data and a sending time of the receiving status information is far less than a time interval (4 ms) between a receiving time of downlink data and a sending time of receiving status information in an existing FDD system. In this way, a latency is effectively reduced.

Further, if the receiving status information indicates that one or more pieces of downlink data in the at least one piece of downlink data received by the terminal device fail to be received (are received incorrectly or not received), the network device may retransmit, in a timeslot n+2 or a timeslot n+3, the one or more pieces of downlink data that fail to be received. That is, a third time domain resource is the timeslot n+2 or the timeslot n+3.

Correspondingly, if the one or more pieces of downlink data in the at least one piece of downlink data received by the terminal device on the first time domain resource fail to be received, the terminal device may receive, in the timeslot n+2 or the timeslot n+3, the one or more pieces of downlink data that are retransmitted by the network device.

It can be learned that, if the first time domain resource is the timeslot n−2, a HARQ RTT is not greater than 2 ms or 2.5 ms (a length of 4 or 5 timeslots), far less than 8 ms in the existing FDD system. If the first time domain resource is the timeslot n−3, a HARQ RTT is not greater than 2.5 ms or 3 ms, less than existing 8 ms.

The HARQ time sequence provided in this embodiment not only can meet a time sequence requirement on inequality between the TTI length of the receiving status information and the TTI length of downlink data, but also reduces the time interval between a time at which the terminal device receives the downlink data and a time at which the terminal device sends the receiving status information, thereby reducing the latency. In addition, the HARQ RTT is reduced; therefore, the latency is further reduced effectively.

Figure 4:
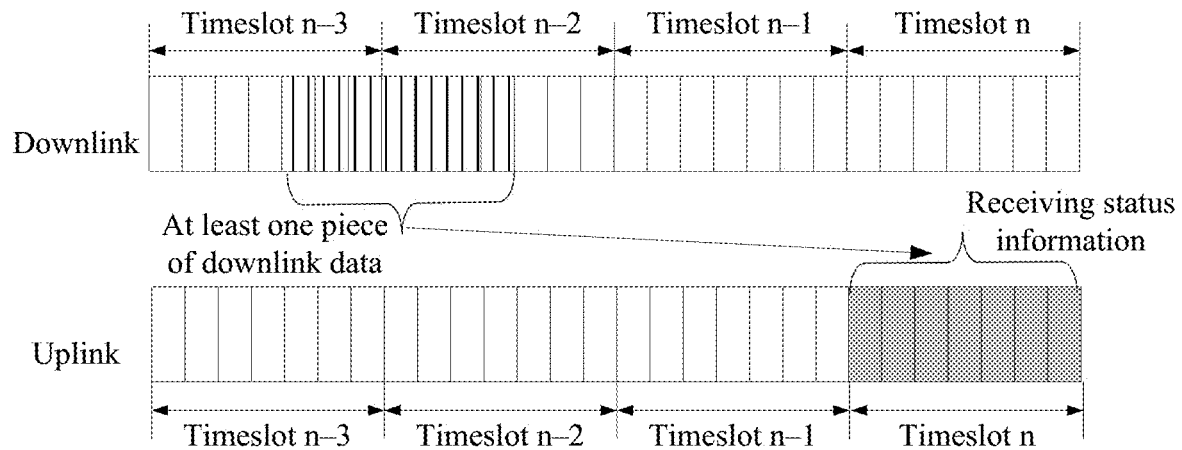
FIG. 4 is a schematic diagram of another HARQ time sequence according to an embodiment of the present invention.

Referring to FIG. 4, FIG. 4 is a schematic diagram of another HARQ time sequence according to an embodiment of the present invention. In this embodiment, a TTI length of receiving status information is 0.5 ms, and a TTI length of any piece of downlink data in at least one piece of downlink data is a length of 4 symbols or 3 symbols. A first time domain resource is the last 3 symbols or 4 symbols of a timeslot n−3 and the first 4 symbols or 3 symbols of a timeslot n−2, and a second time domain resource is a timeslot n.

It can be learned from FIG. 4 that a time interval between a receiving time of the downlink data and a sending time of the receiving status information is less than 1.5 ms (a length of 3 timeslots), far less than 4 ms in an existing FDD system. Therefore, a latency is effectively reduced.

Further, if one or more pieces of downlink data in the at least one piece of downlink data received by a terminal device on the first time domain resource fail to be received, the terminal device sends, on the second time domain resource to a network device, the receiving status information indicating that the one or more pieces of downlink data fail to be received. After receiving the receiving status information, the network device retransmits the one or more pieces of downlink data on a third time domain resource. Correspondingly, the terminal device receives the retransmitted one or more pieces of downlink data on the third time domain resource. The third time domain resource is the last 3 symbols or 4 symbols of a timeslot n+2 and the first 4 symbols or 3 symbols of a timeslot n+3, or the third time domain resource is a timeslot n+2 or a timeslot n+3. It can be learned that a HARQ RTT in this embodiment is not greater than 3 ms (a length of 6 timeslots), far less than 8 ms in the existing FDD system. Therefore, the latency is effectively reduced.

Figure 5:
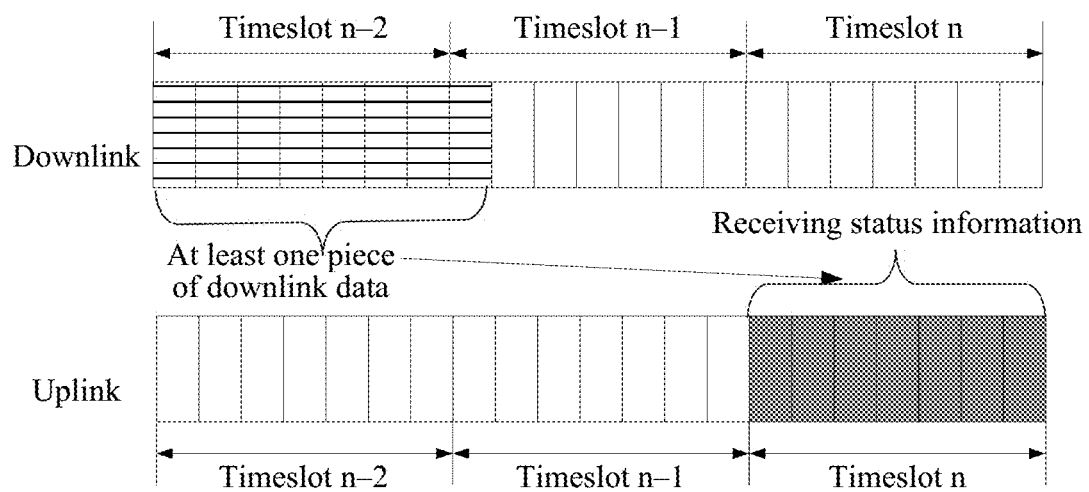
FIG. 5 is a schematic diagram of another HARQ time sequence according to an embodiment of the present invention.

Referring to FIG. 5, FIG. 5 is a schematic diagram of another HARQ time sequence according to an embodiment of the present invention. In this embodiment, a TTI length of receiving status information is 0.5 ms, and a TTI length of any piece of downlink data in at least one piece of downlink data is 2 symbols or 1 symbol. A first time domain resource is a timeslot n−2, and a second time domain resource is a timeslot n.

Optionally, if a TTI length of one piece of downlink data is 2 symbols and the downlink data is located in a last symbol of the timeslot n−2 and a first symbol of a timeslot n−1, the downlink data may also be considered as downlink data received by a terminal device in the timeslot n−2.

Correspondingly, a network device sends the at least one piece of downlink data in the timeslot n−2, and the terminal device receives, in the timeslot n−2, the at least one piece of downlink data sent by the network device. Then, the terminal device sends the receiving status information to the network device in the timeslot n, and the network device receives, in the timeslot n, the receiving status information sent by the terminal device.

In this embodiment, a time interval between a receiving time of the downlink data and a sending time of the receiving status information is less than or equal to 1 ms (a length of 2 timeslots), far less than 4 ms in an existing FDD system. Therefore, a latency is effectively reduced.

Further, if one or more pieces of downlink data in the at least one piece of downlink data received by the terminal device on the first time domain resource fail to be received, and the TTI length of the any piece of downlink data is a length of 1 symbol, the terminal device may receive, after 4 symbols, 0.5 ms, 1 ms, or 1.5 ms after the receiving status information is sent, the one or more pieces of downlink data that are retransmitted by the network device. Correspondingly, if the receiving status information indicates that one or more pieces of downlink data fail to be received, and the TTI length of the any piece of downlink data is a length of 1 symbol, the network device may retransmit the one or more pieces of downlink data after 4 symbols, 0.5 ms, 1 ms, or 1.5 ms after the receiving status information is received. It can be learned that a HARQ RTT is not greater than 2.5 ms (a length of 5 timeslots), far less than 8 ms in the existing FDD system. Therefore, the latency is effectively reduced.

Further, if one or more pieces of downlink data in the at least one piece of downlink data received by the terminal device on the first time domain resource fail to be received, and the TTI length of the any piece of downlink data is a length of 2 symbols, the terminal device may receive, after 8 symbols, 1 ms, or 1.5 ms after the receiving status information is sent, the one or more pieces of downlink data that are retransmitted by the network device. Correspondingly, if the receiving status information indicates that one or more pieces of downlink data fail to be received, and the TTI length of the any piece of downlink data is a length of 2 symbols, the network device may retransmit the one or more pieces of downlink data after 8 symbols, 1 ms, or 1.5 ms after the receiving status information is received. It can be learned that a HARQ RTT is not greater than 2.5 ms (a length of 5 timeslots), far less than 8 ms in the existing FDD system. Therefore, the latency is effectively reduced.

Figure 6:
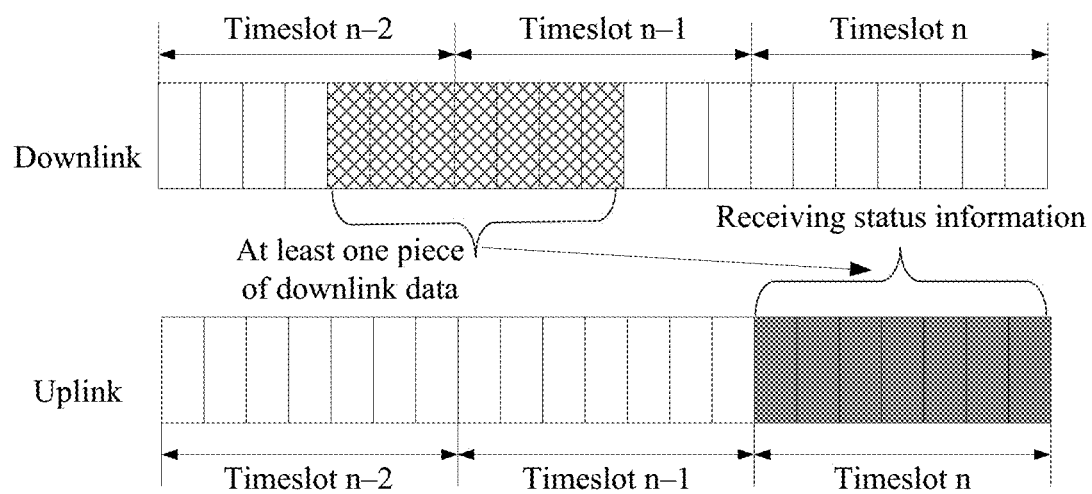
FIG. 6 is a schematic diagram of another HARQ time sequence according to an embodiment of the present invention.

Referring to FIG. 6, FIG. 6 is a schematic diagram of another HARQ time sequence according to an embodiment of the present invention. In this embodiment, a TTI length of receiving status information is 0.5 ms, and a TTI length of any piece of downlink data in at least one piece of downlink data is 1 symbol. A first time domain resource is the last 3 symbols of a timeslot n−2 and the first 4 or 3 symbols of a timeslot n−1, and a second time domain resource is a timeslot n. It can be learned that a time interval between a receiving time of the downlink data and a sending time of the receiving status information is less than 1 ms (a length of 2 timeslots), far less than 4 ms in an existing FDD system. Therefore, a latency can be effectively reduced.

Further, if one or more pieces of downlink data in the at least one piece of downlink data received by a terminal device on the first time domain resource fail to be received, the terminal device sends, on the second time domain resource to a network device, the receiving status information used to indicate that the one or more pieces of downlink data fail to be received. Correspondingly, the network device may retransmit the one or more pieces of downlink data after 4 symbols, 0.5 ms, 1 ms, or 1.5 ms after the receiving status information is received. That is, the terminal device may receive, after 4 symbols, 0.5 ms, 1 ms, or 1.5 ms after the receiving status information is sent, the one or more pieces of downlink data that are retransmitted by the network device. It can be learned that a HARQ RTT is not greater than 2.5 ms, far less than 8 ms in the existing FDD system. Therefore, the latency is effectively reduced.

Figure 7:
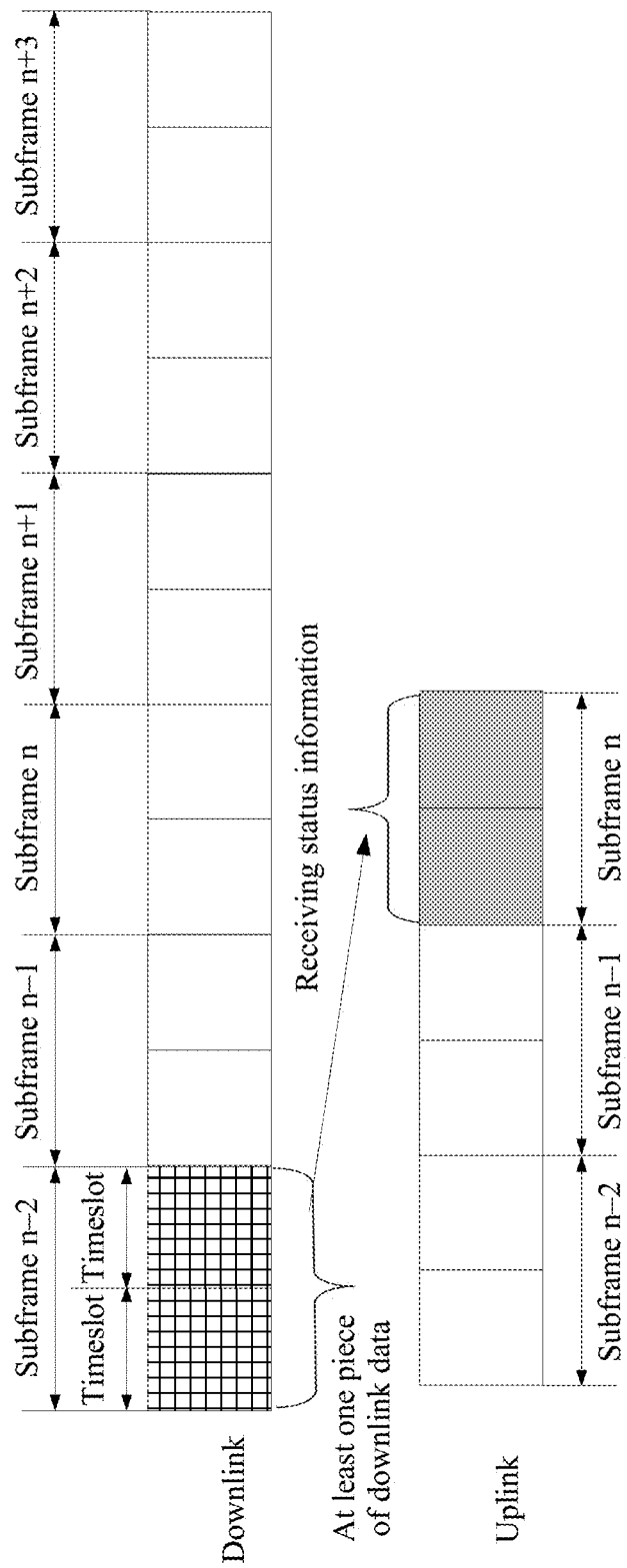
FIG. 7 is a schematic diagram of still another HARQ time sequence according to an embodiment of the present invention.

Referring to FIG. 7, FIG. 7 is a schematic diagram of still another HARQ time sequence according to an embodiment of the present invention. In this embodiment, a TTI length of receiving status information is 1 ms, and a TTI length of any piece of downlink data in at least one piece of downlink data is 0.5 ms. A first time domain resource is a subframe n−2 (as shown in FIG. 7) or a subframe n−3, and a second time domain resource is a subframe n.

If the first time domain resource is the subframe n−2, a time interval between a receiving time of the downlink data and a sending time of the receiving status information (the subframe n) is less than 2 ms; if the first time domain resource is the subframe n−3, a time interval between a receiving time of the downlink data and a sending time of the receiving status information (the subframe n) is less than 3 ms. In the two scenarios, the time interval between a receiving time of the downlink data and a sending time of the receiving status information is less than 4 ms in an existing FDD system. Therefore, a latency can be effectively reduced.

Further, if one or more pieces of downlink data in the at least one piece of downlink data received by a terminal device on the first time domain resource fail to be received, the terminal device sends, on the second time domain resource, the receiving status information indicating that the one or more pieces of downlink data fail to be received. After receiving the receiving status information, a network device may retransmit the one or more pieces of downlink data in a subframe n+2 or a subframe n+3. That is, the terminal device may receive the one or more pieces of downlink data in the subframe n+2 or the subframe n+3. It can be learned that a HARQ RTT is not greater than 4 ms, 5 ms, or 6 ms, less than 8 ms in the existing FDD system. Therefore, the latency is further reduced.

In another application scenario of this embodiment, a TTI length of receiving status information is 1 ms, and a TTI length of any piece of downlink data is 4, 3, 2, or 1 symbol. A first time domain resource is a subframe n−2, and a second time domain resource is a subframe n. It can be learned that a time interval between a receiving time of the downlink data and a sending time of the receiving status information is less than or equal to 2 ms, less than 4 ms in an existing FDD system. Therefore, a latency can be effectively reduced.

Further, if a terminal device fails to receive one or more pieces of downlink data in the at least one piece of downlink data on the first time domain resource, the terminal device may receive, on a third time domain resource, the one or more pieces of downlink data that are retransmitted by a network device. The third time domain resource may be a subframe n+2. It can be learned that a HARQ RTT is less than or equal to 4 ms, far less than 8 ms in the existing FDD system. Therefore, the latency is further reduced.

Figure 8:
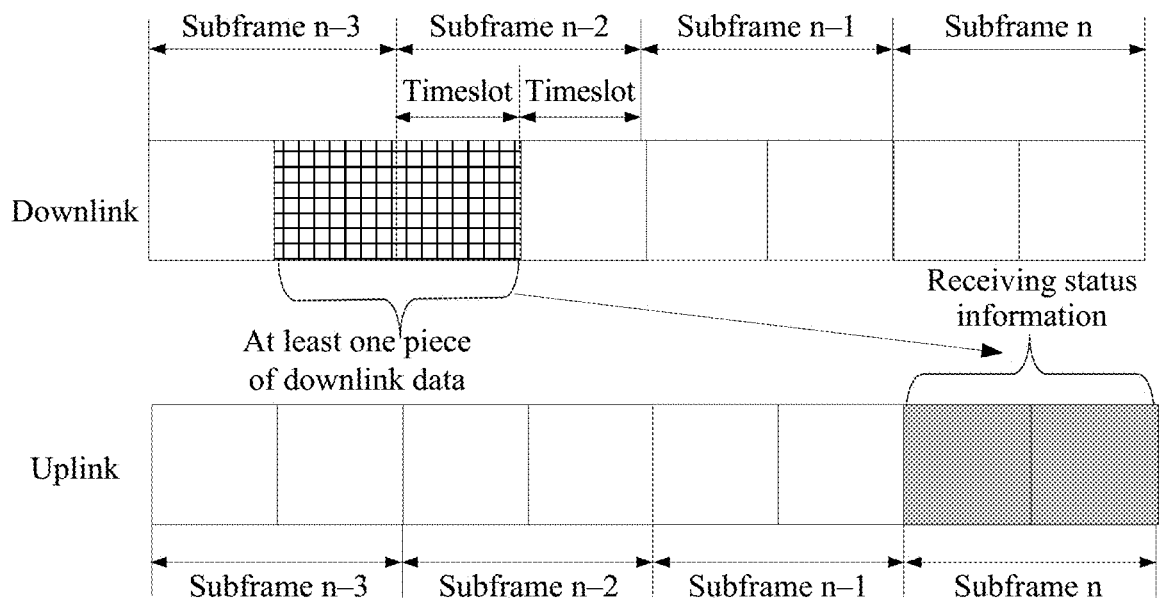
FIG. 8 is a schematic diagram of still another HARQ time sequence according to an embodiment of the present invention.

Referring to FIG. 8, FIG. 8 is a schematic diagram of still another HARQ time sequence according to an embodiment of the present invention. In this embodiment, a TTI length of receiving status information is 1 ms, and a TTI length of any piece of downlink data in at least one piece of downlink data is 0.5 ms. A first time domain resource is a second timeslot of a subframe n−3 and a first timeslot of a subframe n−2, and a second time domain resource is a subframe n. It can be learned that a time interval between a receiving time of the downlink data and a sending time of the receiving status information is less than 3 ms, less than 4 ms in an existing FDD system. Therefore, a latency can be effectively reduced.

Further, if one or more pieces of downlink data in the at least one piece of downlink data received by a terminal device on the first time domain resource fail to be received, after the receiving status information indicating that the one or more pieces of downlink data fail to be received is sent on the second time domain resource, a network device may retransmit the one or more pieces of downlink data in a second timeslot of a subframe n+2 and a first timeslot of a subframe n+3, or a subframe n+2, or a subframe n+3. That is, the terminal device may receive, in the second timeslot of the subframe n+2 and the first timeslot of the subframe n+3, or the subframe n+2, or the subframe n+3, the one or more pieces of downlink data that are retransmitted by the network device. It can be learned that a HARQ RTT is less than 6 ms or 5 ms, less than 8 ms in the existing FDD system. Therefore, the latency is further reduced.

Figure 9:
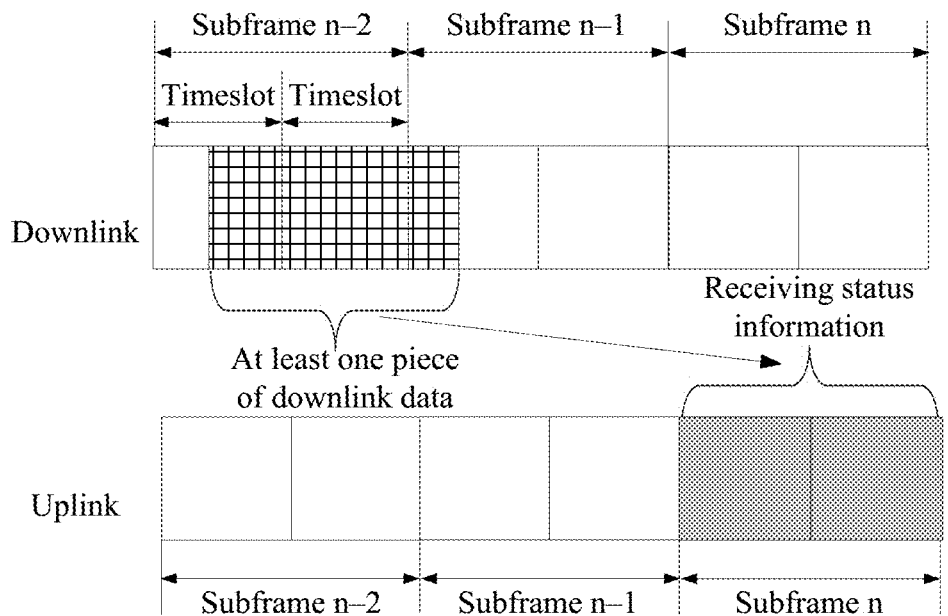
FIG. 9 is a schematic diagram of yet another HARQ time sequence according to an embodiment of the present invention.

Referring to FIG. 9, FIG. 9 is a schematic diagram of yet another HARQ time sequence according to an embodiment of the present invention. In this embodiment, a TTI length of receiving status information is 1 ms, and a TTI length of any piece of downlink data in at least one piece of downlink data is 3 symbols or 4 symbols. A first time domain resource is the last 10 symbols or 9 symbols of a subframe n−2 and the first 4 symbols or 3 symbols of a subframe n−1, and a second time domain resource is a subframe n. It can be learned that a time interval between a receiving time of the downlink data and a sending time of the receiving status information is less than 2 ms, less than 4 ms in an existing FDD system. Therefore, a latency is effectively reduced.

Further, if one or more pieces of downlink data in the at least one piece of downlink data received by a terminal device on the first time domain resource fail to be received, and the receiving status information indicating that the one or more pieces of downlink data fail to be received is sent on the second time domain resource, after receiving the receiving status information, a network device retransmits the one or more pieces of downlink data in a subframe n+2. That is, the terminal device may receive, in the subframe n+2, the one or more pieces of downlink data that are retransmitted by the network device. It can be learned that a HARQ RTT is less than 4 ms, far less than 8 ms in the existing FDD system. Therefore, the latency is further reduced.

Figure 10:
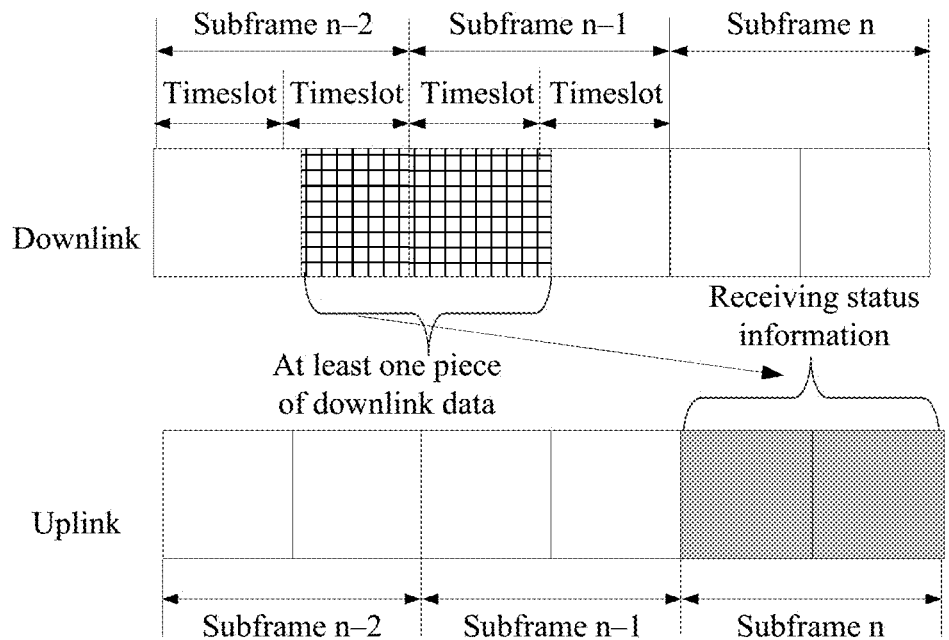
FIG. 10 is a schematic diagram of another HARQ time sequence according to an embodiment of the present invention.

Referring to FIG. 10, FIG. 10 is a schematic diagram of another HARQ time sequence according to an embodiment of the present invention. In this embodiment, a TTI length of receiving status information is 1 ms, and a TTI length of any piece of downlink data in at least one piece of downlink data is 2 symbols. A first time domain resource is the last 6 symbols of a subframe n−2 and the first 8 or 6 symbols of a subframe n−1, or a first time domain resource is a second timeslot of a subframe n−2 and a first timeslot of a subframe n−1, or a first time domain resource is the last 8 symbols of a subframe n−2 and the first 6 or 4 symbols of a subframe n−1. A second time domain resource is a subframe n. It can be learned that a time interval between a receiving time of the downlink data and a sending time of the receiving status information is less than 2 ms, less than 4 ms in an existing FDD system. Therefore, a latency is effectively reduced.

Further, if one or more pieces of downlink data in the at least one piece of downlink data received by a terminal device on the first time domain resource fail to be received, and the receiving status information indicating that the one or more pieces of downlink data fail to be received is sent on the second time domain resource, a network device may retransmit the one or more pieces of downlink data in a subframe n+2. That is, the terminal device may receive, in the subframe n+2, the one or more pieces of downlink data that are retransmitted by the network device. It can be learned that a HARQ RTT is less than 4 ms, far less than 8 ms in the existing FDD system. Therefore, the latency is further reduced.

Figure 11:
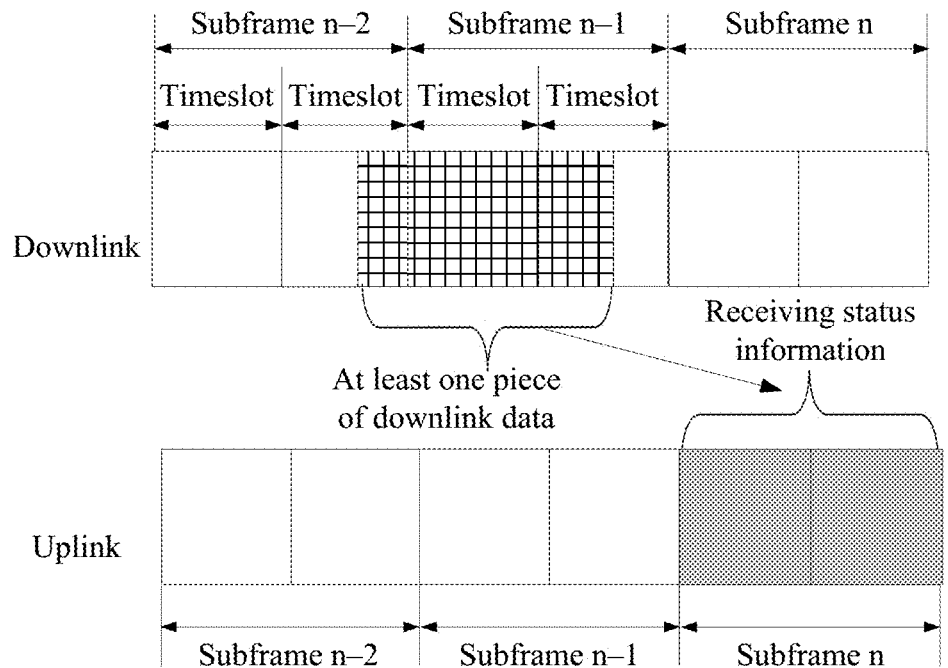
FIG. 11 is a schematic diagram of another HARQ time sequence according to an embodiment of the present invention.

Referring to FIG. 11, FIG. 11 is a schematic diagram of another HARQ time sequence according to an embodiment of the present invention. In this embodiment, a TTI length of receiving status information is 1 ms, and a TTI length of any piece of downlink data in at least one piece of downlink data is 1 symbol. A first time domain resource may be the last 3 symbols of a subframe n−2 and the first 11 or 9 symbols of a subframe n−1, or a first time domain resource may be a second timeslot of a subframe n−2 and a first timeslot of a subframe n−1. A second time domain resource is a subframe n. It can be learned that a time interval between a receiving time of the downlink data and a sending time of the receiving status information is less than 2 ms. Therefore, a latency can be effectively reduced.

Further, if one or more pieces of downlink data in the at least one piece of downlink data received by a terminal device on the first time domain resource fail to be received, and the receiving status information indicating that the one or more pieces of downlink data fail to be received is sent on the second time domain resource, a network device may retransmit the one or more pieces of downlink data in a subframe n+2. That is, the terminal device may receive, in the subframe n+2, the one or more pieces of downlink data that are retransmitted by the network device. It can be learned that a HARQ RTT is less than 4 ms, far less than 8 ms in an existing FDD system. Therefore, the latency is further reduced.

Figure 12:
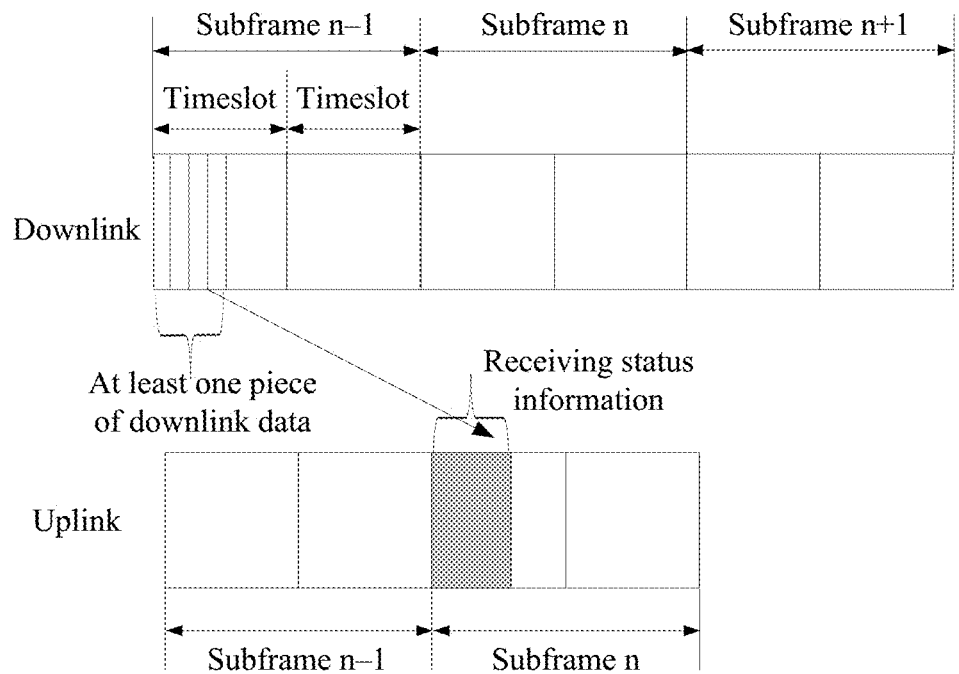
FIG. 12 is a schematic diagram of yet another HARQ time sequence according to an embodiment of the present invention.

Referring to FIG. 12, FIG. 12 is a schematic diagram of yet another HARQ time sequence according to an embodiment of the present invention. In this embodiment, a TTI length of receiving status information is a length of 4 symbols or 3 symbols, and a TTI length of any piece of downlink data is a length of 1 symbol or 2 symbols. A first time domain resource is a symbol set in a subframe n−1, and a second time domain resource is a symbol set in a subframe n. It can be learned that a time interval between the second time domain resource and the first time domain resource is less than or equal to 1 ms, less than 4 ms in an existing FDD system. Therefore, a latency is effectively reduced.

Optionally, the first time domain resource may be an $i^{th}$ downlink symbol set in the subframe n−1, the second time domain resource may be an $i^{th}$ uplink symbol set in the subframe n, and i is 1, 2, 3, or 4.

Optionally, the first time domain resource may be a second downlink symbol set in the subframe n−1, and the second time domain resource may be a first uplink symbol set in the subframe n; the first time domain resource may be a third downlink symbol set in the subframe n−1, and the second time domain resource may be a second uplink symbol set in the subframe n; the first time domain resource may be a fourth downlink symbol set in the subframe n−1, and the second time domain resource may be a third uplink symbol set in the subframe n; or the first time domain resource may be a first downlink symbol set in the subframe n, and the second time domain resource may be a fourth uplink symbol set in the subframe n.

For ease of description, a concept of a symbol set is introduced in this embodiment. A normal CP subframe is used as an example to describe the first eight types of the following symbol set structures. The normal CP subframe includes symbols with sequence numbers {#0, #1, #2, #3, #4, #5, #6, #7, #8, #9, #10, #11, #12, #13}. An extended CP is used as an example to describe a structure 9 and a structure 10, and an extended CP subframe includes symbols with sequence numbers {#0, #1, #2, #3, #4, #5, #6, #7, #8, #9, #10, #11}.

One downlink subframe includes 4 downlink symbol sets and is specifically divided into a first downlink symbol set, a second downlink symbol set, a third downlink symbol set, and a fourth downlink symbol set based on a downlink structure 1, 2, 3, 4, 5, 6, 7, 8, 9, or 10. One uplink subframe includes 4 uplink symbol sets and is specifically divided into a first uplink symbol set, a second uplink symbol set, a third uplink symbol set, and a fourth uplink symbol set based on the following uplink subframe symbol set structure 1, 2, 3, 4, 9, or 10.

When the receiving status information is transmitted on a symbol set, a TTI of the receiving status information is all symbols included in the symbol set. For example, if a symbol set for transmitting the receiving status information includes 4 symbols, the TTI of the receiving status information is in a length of 4 symbols; if a symbol set for transmitting the receiving status information includes 3 symbols, the TTI of the receiving status information is in a length of 3 symbols.

Uplink/downlink subframe symbol set structure 1: a first uplink/downlink symbol set includes symbols with sequence numbers {#0, #1, #2, #3}, a second uplink/downlink symbol set includes symbols with sequence numbers {#4, #5, #6}, a third uplink/downlink symbol set includes symbols with sequence numbers {#7, #8, #9, #10}, and a fourth uplink/downlink symbol set includes symbols with sequence numbers {#11, #12, #13}.

Uplink/downlink subframe symbol set structure 2: a first uplink/downlink symbol set includes symbols with sequence numbers {#0, #1, #2}, a second uplink/downlink symbol set includes symbols with sequence numbers {#3, #4, #5, #6}, a third uplink/downlink symbol set includes symbols with sequence numbers {#7, #8, #9}, and a fourth uplink/downlink symbol set includes symbols with sequence numbers {#10, #11, #12, #13}.

Uplink/downlink subframe symbol set structure 3: a first uplink/downlink symbol set includes symbols with sequence numbers {#0, #1, #2, #3}, a second uplink/downlink symbol set includes symbols with sequence numbers {#4, #5, #6}, a third uplink/downlink symbol set includes symbols with sequence numbers {#7, #8, #9}, and a fourth uplink/downlink symbol set includes symbols with sequence numbers {#10, #11, #12, #13}.

Uplink/downlink subframe symbol set structure 4: a first uplink/downlink symbol set includes symbols with sequence numbers {#0, #1, #2}, a second uplink/downlink symbol set includes symbols with sequence numbers {#3, #4, #5, #6}, a third uplink/downlink symbol set includes symbols with sequence numbers {#7, #8, #9, #10}, and a fourth uplink/downlink symbol set includes symbols with sequence numbers {#11, #12, #13}.

Downlink subframe symbol set structure 5: a first downlink symbol set includes symbols with sequence numbers {#0, #1, #2, #3}, a second downlink symbol set includes symbols with sequence numbers {#4, #5, #6, #7}, a third downlink symbol set includes symbols with sequence numbers {#8, #9, #10, #11}, and a fourth downlink symbol set includes symbols with sequence numbers {#12, #13}.

Downlink subframe symbol set structure 6: a first downlink symbol set includes symbols with sequence numbers {#0, #1, #2, #3}, a second downlink symbol set includes symbols with sequence numbers {#4, #5, #6, #7}, a third downlink symbol set includes symbols with sequence numbers {#8, #9}, and a fourth downlink symbol set includes symbols with sequence numbers {#10, #11, #12, #13}.

Downlink subframe symbol set structure 7: a first downlink symbol set includes symbols with sequence numbers {#0, #1, #2, #3}, a second downlink symbol set includes symbols with sequence numbers {#4, #5}, a third downlink symbol set includes symbols with sequence numbers {#6, #7, #8, #9}, and a fourth downlink symbol set includes symbols with sequence numbers {#10, #11, #12, #13}.

Downlink subframe symbol set structure 8: a first downlink symbol set includes symbols with sequence numbers {#0, #1}, a second downlink symbol set includes symbols with sequence numbers {#2, #3, #4, #5}, a third downlink symbol set includes symbols with sequence numbers {#6, #7, #8, #9}, and a fourth downlink symbol set includes symbols with sequence numbers {#10, #11, #12, #13}.

Uplink/downlink subframe symbol set structure 9: a first uplink/downlink symbol set includes symbols with sequence numbers {#0, #1, #2}, a second uplink/downlink symbol set includes symbols with sequence numbers {#3, #4, #5}, a third uplink/downlink symbol set includes symbols with sequence numbers {#6, #7, #8}, and a fourth uplink/downlink symbol set includes symbols with sequence numbers {#9, #10, #11}.

Uplink/downlink subframe symbol set structure 10: a first uplink/downlink symbol set includes symbols with sequence numbers {#0, #1, #2, #3}, a second uplink/downlink symbol set includes symbols with sequence numbers {#4, #5}, a third uplink/downlink symbol set includes symbols with sequence numbers {#6, #7, #8, #9}, and a fourth uplink/downlink symbol set includes symbols with sequence numbers {#10, #11}.

Further, if one or more pieces of downlink data in at least one piece of downlink data received by a terminal device on the first time domain resource fail to be received, and after the receiving status information indicating that the one or more pieces of downlink data fail to be received is sent on the second time domain resource, a network device may retransmit the one or more pieces of downlink data on a third time domain resource. That is, the terminal device may receive, on the third time domain resource, the one or more pieces of downlink data that are retransmitted by the network device.

Optionally, the third time domain resource may be an $i^{th}$ downlink symbol set in a subframe n+1, and i is 1, 2, 3, or 4.

Optionally, if the second time domain resource may be the first uplink symbol set in the subframe n, the third time domain resource may be a fourth downlink symbol set in the subframe n+1; if the second time domain resource is the second uplink symbol set in the subframe n, the third time domain resource is a first downlink symbol set in the subframe n+1; if the second time domain resource is the third uplink symbol set in the subframe n, the third time domain resource is a second downlink symbol set in the subframe n+1; or if the second time domain resource is the fourth uplink symbol set in the subframe n, the third time domain resource is a third downlink symbol set in the subframe n+1. It can be learned that a HARQ RTT is less than or equal to 2 ms. Therefore, a latency is effectively reduced.

In still another embodiment of the present invention, a TTI length of receiving status information is a length of 2 symbols, and a TTI length of any piece of downlink data in at least one piece of downlink data is a length of 1 symbol. A time interval between a second time domain resource and a first time domain resource is less than 1 ms. It can be learned that the time interval is less than 4 ms in an existing FDD system. Therefore, a latency is effectively reduced.

For ease of description, a concept of a symbol set is also introduced. One normal CP subframe includes 7 symbol sets, every two symbols form one symbol set, and the 7 symbol sets are a first symbol set, a second symbol set, a third symbol set, a fourth symbol set, a fifth symbol set, a sixth symbol set, and a seventh symbol set.

Optionally, the first time domain resource may be a fifth symbol set in a subframe n−1, and the second time domain resource may be a first symbol set in a subframe n; the first time domain resource may be a sixth symbol set in a subframe n−1, and the second time domain resource may be a second symbol set in a subframe n; the first time domain resource may be a seventh symbol set in a subframe n−1, and the second time domain resource may be a third symbol set in a subframe n; the first time domain resource may be a first symbol set in a subframe n, and the second time domain resource may be a fourth symbol set in the subframe n; the first time domain resource may be a second symbol set in a subframe n, and the second time domain resource may be a fifth symbol set in the subframe n; the first time domain resource may be a third symbol set in a subframe n, and the second time domain resource may be a sixth symbol set in the subframe n; or the first time domain resource may be a fourth symbol set in a subframe n, and the second time domain resource may be a seventh symbol set in the subframe n.

Optionally, the first time domain resource may be a fourth symbol set in a subframe n−1, and the second time domain resource may be a first symbol set in a subframe n; the first time domain resource may be a fifth symbol set in a subframe n−1, and the second time domain resource may be a second symbol set in a subframe n; the first time domain resource may be a sixth symbol set in a subframe n−1, and the second time domain resource may be a third symbol set in a subframe n; the first time domain resource may be a seventh symbol set in a subframe n−1, and the second time domain resource may be a fourth symbol set in a subframe n; the first time domain resource may be a first symbol set in a subframe n, and the second time domain resource may be a fifth symbol set in the subframe n; the first time domain resource may be a second symbol set in a subframe n, and the second time domain resource may be a sixth symbol set in the subframe n; or the first time domain resource may be a third symbol set in a subframe n, and the second time domain resource may be a seventh symbol set in the subframe n.

Optionally, the first time domain resource is a symbol j−6 and a symbol j−5, the first time domain resource is a symbol j−8 and a symbol j−7, or the first time domain resource is a symbol j−5 and a symbol j−4. The second time domain resource is a symbol j and a symbol j+1. The symbol j−4 is a fourth symbol counted backward from a symbol j; the symbol j−5 is a fifth symbol counted backward from the symbol j; the symbol j−6 is a sixth symbol counted backward from the symbol j; the symbol j−7 is a seventh symbol counted backward from the symbol j; and the symbol j−8 is an eighth symbol counted backward from the symbol j. The symbol j+1 is a first symbol counted forward from the symbol j. For example, if j=0, that is, if the symbol j is a symbol with a sequence number #0, the symbol j−4 is a symbol, with a sequence number #11, in a subframe previous to a subframe to which the symbol j belongs, and so on. Various cases are not described one by one by using examples herein.

Further, if one or more pieces of downlink data in the at least one piece of downlink data received by a terminal device on the first time domain resource fail to be received, and the receiving status information indicating that the one or more pieces of downlink data fail to be received is sent on the second time domain resource, a network device may retransmit the one or more pieces of downlink data on a third time domain resource. That is, the terminal device may receive, on the third time domain resource, the one or more pieces of downlink data that are retransmitted by the network device. A time interval between the third time domain resource and the first time domain resource is less than 8 ms.

Optionally, the second time domain resource may be the first symbol set in the subframe n, and the third time domain resource may be the fourth symbol set in the subframe n; the second time domain resource may be the second symbol set in the subframe n, and the third time domain resource may be the fifth symbol set in the subframe n; the second time domain resource may be the third symbol set in the subframe n, and the third time domain resource may be the sixth symbol set in the subframe n; the second time domain resource may be the fourth symbol set in the subframe n, and the third time domain resource may be the seventh symbol set in the subframe n; the second time domain resource may be the fifth symbol set in the subframe n, and the third time domain resource may be a first symbol set in a subframe n+1; the second time domain resource may be the sixth symbol set in the subframe n, and the third time domain resource may be a second symbol set in a subframe n+1; or the second time domain resource may be the seventh symbol set in the subframe n, and the third time domain resource may be a third symbol set in a subframe n+1.

Optionally, the second time domain resource may be the first symbol set in the subframe n, and the third time domain resource may be the fifth symbol set in the subframe n; the second time domain resource may be the second symbol set in the subframe n, and the third time domain resource may be the sixth symbol set in the subframe n; the second time domain resource may be the third symbol set in the subframe n, and the third time domain resource may be the seventh symbol set in the subframe n; the second time domain resource may be the fourth symbol set in the subframe n, and the third time domain resource may be a first symbol set in a subframe n+1; the second time domain resource may be the fifth symbol set in the subframe n, and the third time domain resource may be a second symbol set in a subframe n+1; the second time domain resource may be the sixth symbol set in the subframe n, and the third time domain resource may be a third symbol set in a subframe n+1; or the second time domain resource may be the seventh symbol set in the subframe n, and the third time domain resource may be a fourth symbol set in a subframe n+1.

Optionally, the second time domain resource is the symbol j and the symbol j+1; and the third time domain resource is a symbol j+6 and a symbol j+7, a symbol j+8 and a symbol j+9, or a symbol j+5 and a symbol j+6. The symbol j+6 is a sixth symbol counted forward from the symbol j; the symbol j+7 is a seventh symbol counted forward from the symbol j; the symbol j+8 is an eighth symbol counted forward from the symbol j; and the symbol j+9 is a ninth symbol counted forward from the symbol j. For example, if j=9, that is, if the symbol j is a symbol with a sequence number #9, the symbol j+5 is a symbol, with a sequence number #0, in a subframe next to a subframe to which the symbol j belongs.

It can be learned that a HARQ RTT is less than 2 ms, far less than 8 ms in an existing FDD system. Therefore, a latency is further reduced.

In an embodiment of the present invention, the receiving status information sent by the terminal device is carried on a PUCCH, and the TTI length of the receiving status information is 0.5 ms. In this application scenario, a transmission structure of the PUCCH and a PUCCH DMRS may be the following structure 1 or structure 2.

Structure 1: The PUCCH DMRS is located on the first N symbols of a second time domain resource (recorded as a timeslot n), the PUCCH is located on the other 7-N or 6-N symbols of the second time domain resource, and N is 1, 2, or 3. That is, the terminal device sends the PUCCH DMRS in the first N successive symbols of the second time domain resource, and sends the PUCCH in the other symbols of the second time domain resource. The PUCCH DMRS is used to demodulate the PUCCH.

Figure 13:
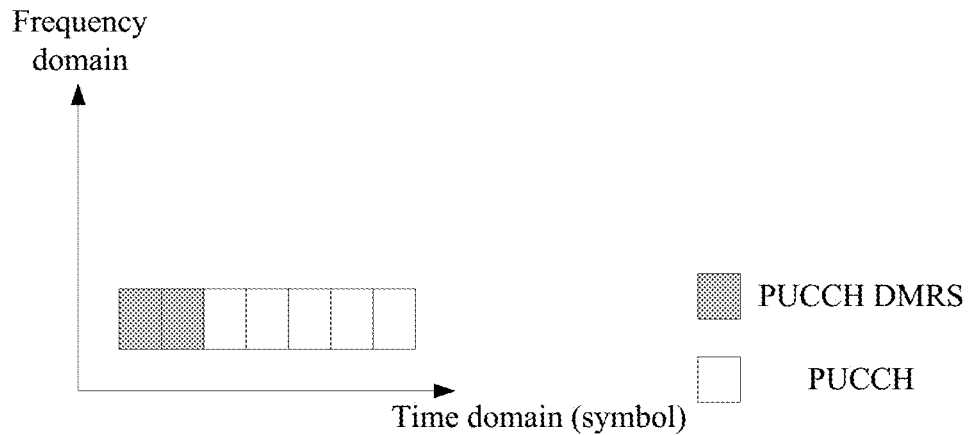
FIG. 13 is a schematic diagram of a receiving status information transmission structure according to an embodiment of the present invention.

FIG. 13 is a schematic diagram of a receiving status information transmission structure according to an embodiment of the present invention. In this embodiment, a normal CP subframe is used as an example for description, and the normal CP subframe includes 14 symbols.

As shown in FIG. 13, receiving status information occupies one timeslot. The timeslot includes 7 symbols, where the first 2 symbols are used to transmit a PUCCH DMRS, and the last 5 symbols are used to transmit a PUCCH.

After receiving downlink data, a terminal device demodulates the downlink data and configures the receiving status information based on a demodulation result. Therefore, the terminal device cannot start to configure the receiving status information until the downlink data demodulation is completed. However, configuration of the PUCCH DMRS is independent of a receiving status of the downlink data, that is, the terminal device can start to configure the PUCCH DMRS if the terminal device determines that there is downlink data transmitted. Therefore, a sending moment of the PUCCH DMRS may be earlier than a sending moment of the PUCCH. In this way, more processing time can be reserved for the terminal device.

Structure 2: The PUCCH includes a first PUCCH and a second PUCCH, and the PUCCH DMRS includes a first PUCCH DMRS and a second PUCCH DMRS.

The first PUCCH and the first PUCCH DMRS are located in the first M1 symbols of a second time domain resource in a time domain, and are located on a first frequency domain resource in a frequency domain. The second PUCCH and the second PUCCH DMRS are located in the last M2 symbols of the second time domain resource in the time domain, and are located on a second frequency domain resource in the frequency domain. This embodiment also uses a normal CP subframe as an example for description. M1 is 3 and M2 is 4, or M1 is 4 and M2 is 3. When the structure 2 is used, a frequency domain diversity gain may be obtained, and PUCCH demodulation performance is improved.

Correspondingly, that the terminal device sends the receiving status information to a network device on the second time domain resource includes:

sending, by the terminal device, the first PUCCH and the first PUCCH DMRS in the first M1 symbols of the second time domain resource, where the first PUCCH and the first PUCCH DMRS occupy the first frequency domain resource; and sending, by the terminal device, the second PUCCH and the second PUCCH DMRS in the last M2 symbols of the second time domain resource, where the second PUCCH and the second PUCCH DMRS occupy the second frequency domain resource.

With reference to FIG. 14a to FIG. 14h, a receiving status information transmission structure in the structure 2 may include the following structures.

As shown in FIG. 14a, FIG. 14b, FIG. 14c, or FIG. 14d, a first PUCCH and a first PUCCH DMRS are located in the first 3 symbols of a second time domain resource in a time domain, and are located on a first frequency domain resource in a frequency domain; and a second PUCCH and a second PUCCH DMRS are located in the last 4 symbols of the second time domain resource in the time domain, and are located on a second frequency domain resource in the frequency domain.

Figure 14A:
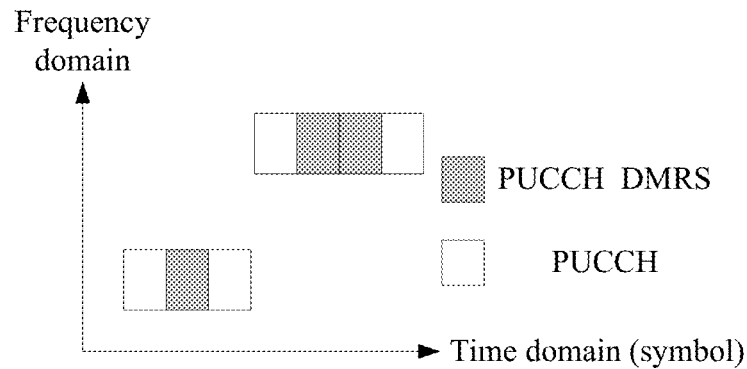
FIG. 14a is a schematic diagram of another receiving status information transmission structure according to an embodiment of the present invention.
Figure 14B:
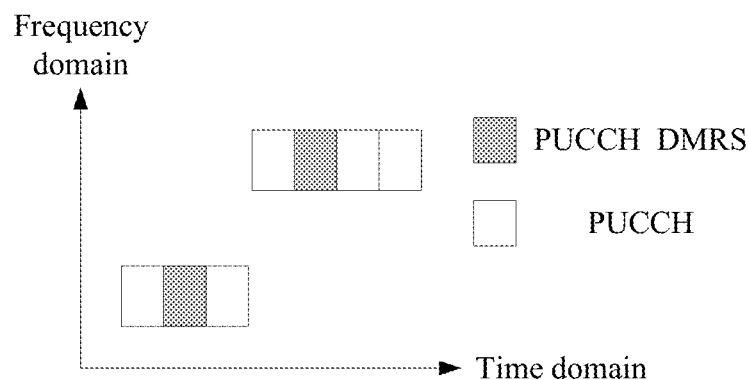
FIG. 14b is a schematic diagram of another receiving status information transmission structure according to an embodiment of the present invention.
Figure 14C:
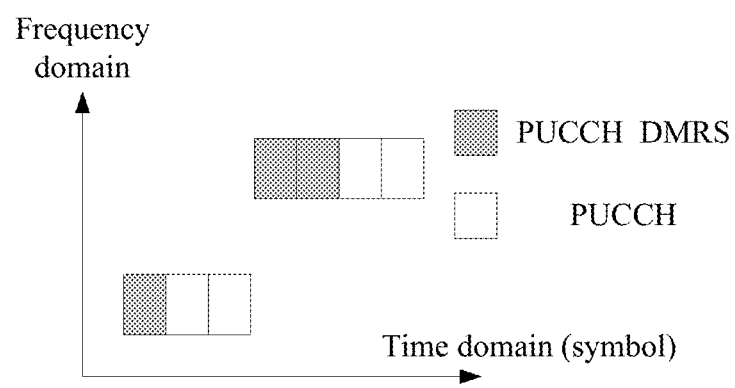
FIG. 14c is a schematic diagram of another receiving status information transmission structure according to an embodiment of the present invention.
Figure 14D:
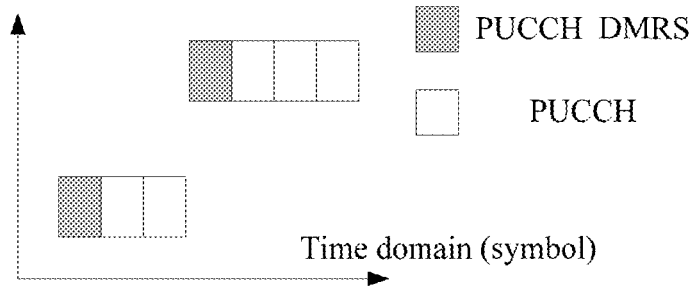
FIG. 14d is a schematic diagram of another receiving status information transmission structure according to an embodiment of the present invention.

As shown in FIG. 14a and FIG. 14b, the first PUCCH DMRS may be located in a second symbol of the second time domain resource; or as shown in FIG. 14c and FIG. 14d, the first PUCCH DMRS may be located in a first symbol of the second time domain resource.

As shown in FIG. 14a, the second PUCCH DMRS may be located in a fifth symbol and a sixth symbol of the second time domain resource; as shown in FIG. 14b, the second PUCCH DMRS may be located in a fifth symbol of the second time domain resource; as shown in FIG. 14c, the second PUCCH DMRS may be located in a fourth symbol and a fifth symbol of the second time domain resource; or as shown in FIG. 14d, the second PUCCH DMRS may be located in a fourth symbol of the second time domain resource.

As shown in FIG. 14e, FIG. 14f, FIG. 14g, or FIG. 14h, a first PUCCH and a first PUCCH DMRS are located in the first 4 symbols of a second time domain resource in a time domain, and are located on a first frequency domain resource in a frequency domain; and a second PUCCH and a second PUCCH DMRS are located in the last 3 symbols of the second time domain resource in the time domain, and are located on a second frequency domain resource in the frequency domain.

Figure 14E:
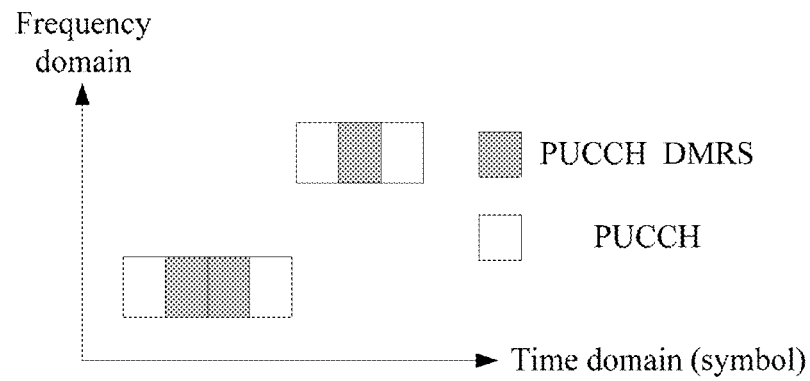
FIG. 14e is a schematic diagram of another receiving status information transmission structure according to an embodiment of the present invention.
Figure 14F:
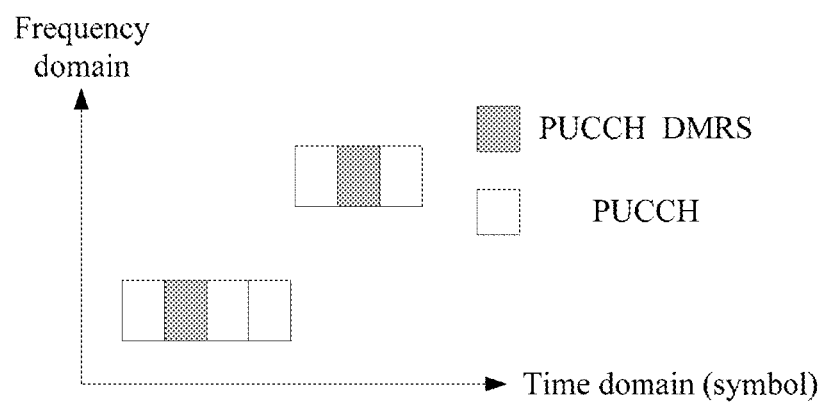
FIG. 14f is a schematic diagram of another receiving status information transmission structure according to an embodiment of the present invention.
Figure 14G:
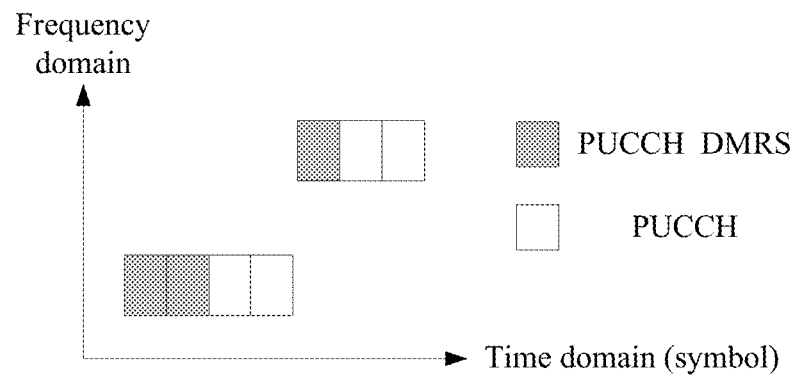
FIG. 14g is a schematic diagram of another receiving status information transmission structure according to an embodiment of the present invention.
Figure 14H:
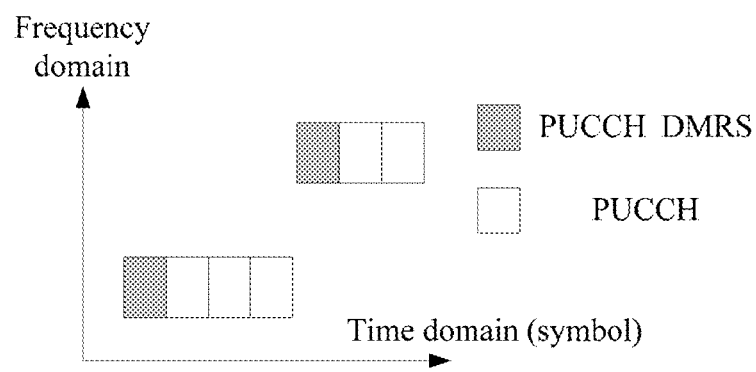
FIG. 14h is a schematic diagram of another receiving status information transmission structure according to an embodiment of the present invention.

As shown in FIG. 14e, the first PUCCH DMRS is located in a second symbol and a third symbol of the second time domain resource; as shown in FIG. 14f, the first PUCCH DMRS is located in a second symbol of the second time domain resource; as shown in FIG. 14g, the first PUCCH DMRS is located in a first symbol and a second symbol of the second time domain resource; or as shown in FIG. 14h, the first PUCCH DMRS is located in a first symbol of the second time domain resource.

As shown in FIG. 14e or FIG. 14f, the second PUCCH DMRS is located in a sixth symbol of the second time domain resource; or as shown in FIG. 14g or FIG. 14h, the second PUCCH DMRS is located in a fifth symbol of the second time domain resource.

Figure 15:
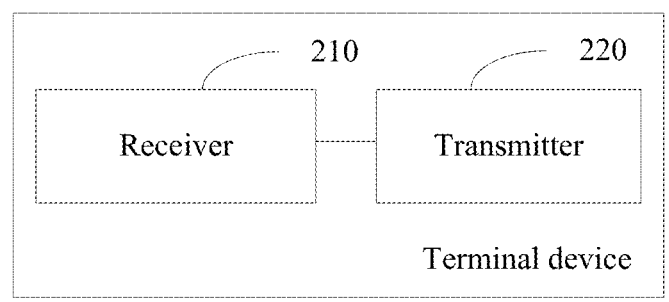
FIG. 15 is a block diagram of a terminal device according to an embodiment of the present invention.

Referring to FIG. 15, FIG. 15 is a block diagram of a terminal device according to an embodiment of the present invention. As shown in FIG. 15, the terminal device includes a receiver 210 and a transmitter 220.

The receiver 210 is configured to receive at least one piece of downlink data on a first time domain resource.

The transmitter 220 is configured to send receiving status information on a second time domain resource, where the receiving status information is used to indicate a receiving status of the at least one piece of downlink data.

A transmission time interval of the receiving status information is greater than a transmission time interval of any piece of downlink data in the at least one piece of downlink data, the transmission time interval of the any piece of downlink data is less than 1 ms, and a time interval between the second time domain resource and the first time domain resource is less than 4 ms.

Optionally, based on the embodiment shown in FIG. 15, a processor may further be included, where an input end of the processor is coupled with the receiver, and an output end of the processor is coupled with the transmitter. The processor is configured to generate the receiving status information based on the receiving status of the at least one piece of downlink data received by the receiver.

Optionally, when the processor is configured to generate the receiving status information based on the receiving status of the at least one piece of downlink data received by the receiver, the processor may be specifically configured to determine receiving statuses of all downlink data in the at least one piece of downlink data, and generate the receiving status information based on the receiving statuses of all the downlink data.

It should be noted that how a receiving status of downlink data is determined is not limited in the present disclosure, and any manner in which whether downlink data is successfully received by the receiver or not can be determined can be applied in the present disclosure.

In addition, for a manner of generating the receiving status information based on the receiving statuses of all the downlink data in the at least one piece of downlink data, reference may be made to corresponding content in the method embodiments. Details are not described herein again.

Optionally, the receiver 210 is further configured to: when one or more pieces of downlink data in the at least one piece of downlink data fail to be received on the first time domain resource, receive, on a third time domain resource, the one or more pieces of downlink data that are retransmitted by a network device. A time interval between the third time domain resource and the first time domain resource is less than 8 ms.

For specific distribution of the first time domain resource, the second time domain resource, and the third time domain resource, refer to corresponding content in the foregoing method embodiments. Details are not described herein again.

For a receiving status information transmission structure, refer to corresponding content in the foregoing method embodiments. Details are not described herein again.

The terminal device provided in this embodiment receives the at least one piece of downlink data on the first time domain resource; and then sends the receiving status information on the second time domain resource. The time interval between the second time domain resource and the first time domain resource is less than 4 ms, the transmission time interval of the any piece of downlink data is less than the transmission time interval of the receiving status information, and the transmission time interval of the any piece of downlink data is less than 1 ms. When the terminal device transmits data, a transmission time interval of downlink data and a time interval between a sending time of the receiving status information and a receiving time of the at least one piece of downlink data are shortened, thereby reducing a latency. In addition, the transmission time interval of the receiving status information (namely, uplink data) is greater than the transmission time interval of downlink data. This enhances performance for receiving the receiving status information, and increases a probability that the network device correctly receives the receiving status information returned by the terminal device. In addition, a HARQ RTT is reduced (less than 8 ms), and the latency is further reduced effectively.

Figure 16:
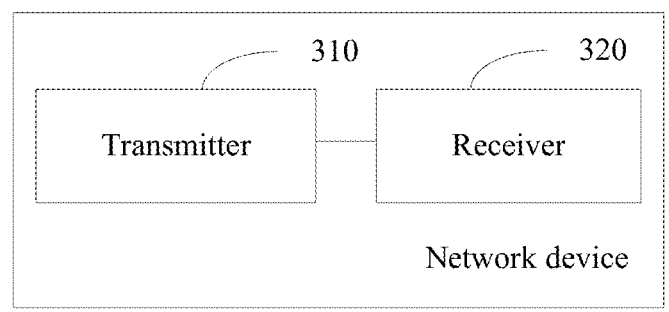
FIG. 16 is a block diagram of a network device according to an embodiment of the present invention.

Referring to FIG. 16, FIG. 16 is a block diagram of a network device according to an embodiment of the present invention. As shown in FIG. 16, the network device includes a transmitter 310 and a receiver 320.

The transmitter 310 is configured to send at least one piece of downlink data on a first time domain resource.

The network device sends the at least one piece of downlink data to a terminal device by using the transmitter 310.

The receiver 320 is configured to receive, on a second time domain resource, receiving status information sent by the terminal device, where the receiving status information is used to indicate a receiving status of the at least one piece of downlink data.

A transmission time interval of the receiving status information is greater than a transmission time interval of any piece of downlink data in the at least one piece of downlink data, the transmission time interval of the any piece of downlink data is less than 1 ms, and a time interval between the second time domain resource and the first time domain resource is less than 4 ms.

Optionally, the transmitter 310 is further configured to: when the receiving status information indicates that one or more pieces of downlink data in the at least one piece of downlink data fail to be received, retransmit the one or more pieces of downlink data on a third time domain resource. A time interval between the third time domain resource and the first time domain resource is less than 8 ms.

For specific distribution of the first time domain resource, the second time domain resource, and the third time domain resource, refer to corresponding content in the foregoing method embodiments. Details are not described herein again.

The network device provided in this embodiment sends the at least one piece of downlink data on the first time domain resource; and then receives, on the second time domain resource, the receiving status information sent by the terminal device. The time interval between the second time domain resource and the first time domain resource is less than 4 ms. In addition, the transmission time interval of the any piece of downlink data is less than the transmission time interval of the receiving status information, and the transmission time interval of the any piece of downlink data is less than 1 ms. When the network device transmits data, a transmission time interval of downlink data and a time interval between a sending time of the receiving status information and a receiving time of the at least one piece of downlink data are shortened, thereby reducing a latency. In addition, the transmission time interval of the receiving status information (namely, uplink data) is greater than the transmission time interval of downlink data. This enhances performance for receiving the receiving status information, and increases a probability that the network device correctly receives the receiving status information returned by the terminal device. In addition, the time interval between the third time domain resource and the first time domain resource is reduced (a HARQ RTT is less than 8 ms), and the latency is further reduced effectively.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A data transmission method, comprising:
   receiving, by a terminal device and via a downlink channel, at least one piece of downlink data on a first time domain resource; and
   sending, by the terminal device and via an uplink channel, receiving status information on a second time domain resource, wherein
   the receiving status information is used to indicate a receiving status of the at least one piece of downlink data, a time interval between the second time domain resource and the first time domain resource is less than 4 milliseconds, a transmission time interval of the uplink channel carrying the receiving status information is greater than a transmission time interval of the downlink channel carrying any piece of downlink data in the at least one piece of downlink data, the transmission time interval of the downlink channel carrying the any piece of downlink data is less than 1 millisecond;
   wherein a length of the transmission time interval of the downlink channel carrying the any piece of downlink data in the at least one piece of downlink data is one of 2 symbols and 1 symbol, and the transmission time interval of the uplink channel carrying the receiving status information is 0.5 ms; and
   the first time domain resource is a timeslot n−2 and the second time domain resource is a timeslot n, wherein the timeslot n−2 is a second timeslot counted backward from the timeslot n, each of the timeslots consists of 6 or 7 symbols, and each of the timeslots has a length of 0.5 ms,
   and the uplink channel is a physical uplink control channel (PUCCH).

2. The method according to claim 1, wherein
   the transmission time interval of the downlink channel carrying any piece of downlink data in the at least one piece of downlink data is one of 1, 2, 3, and 4 symbols, and the transmission time interval of the uplink channel carrying the receiving status information is one of 0.5 ms and 1 ms.

3. The method according to claim 2, wherein the method further comprises:
   if the terminal device fails to receive one or more pieces of downlink data in the at least one piece of downlink data on the first time domain resource, receiving, by the terminal device, the retransmitted one or more pieces of downlink data on a third time domain resource; wherein
   the third time domain resource is a timeslot n+2 or a timeslot n+3, the timeslot n+2 is a second timeslot counted forward from the timeslot n, and the timeslot n+3 is a third timeslot counted forward from the timeslot n.

4. The method according to claim 1, wherein the transmission time interval of the any piece of downlink data in the at least one piece of downlink data is 0.5 ms, and the transmission time interval of the receiving status information is 1 ms; and
   the first time domain resource is one of a subframe n−2 and a subframe n−3 and the second time domain resource is a subframe n, wherein the subframe n−2 is a second subframe counted backward from the subframe n, and the subframe n−3 is a third subframe counted backward from the subframe n.

5. The method according to claim 1, wherein
   before receiving, by the terminal device, the at least one piece of downlink data on the first time domain resource,
   receiving, by the terminal device, signaling, wherein the signaling indicates at least one of:
   a time interval between a second time domain resource and a first time domain resource,
   a time interval between a second time domain resource and a third time domain resource, and
   a time interval between a third time domain resource and a first time domain resource.

6. The method according to claim 1, wherein the transmission time interval of PUCCH is 0.5 ms, the PUCCH comprises a first PUCCH and a second PUCCH, and a PUCCH DMRS comprises a first PUCCH DMRS and a second PUCCH DMRS; and
   the sending, by the terminal device, receiving status information on a second time domain resource comprises:
   sending, by the terminal device, the first PUCCH and the first PUCCH DMRS in the first M1 symbols of the second time domain resource, wherein the first PUCCH and the first PUCCH DMRS occupy a first frequency domain resource in a frequency domain; and
   sending, by the terminal device, the second PUCCH and the second PUCCH DMRS in the last M2 symbols of the second time domain resource, wherein the second PUCCH and the second PUCCH DMRS occupy a second frequency domain resource in the frequency domain; wherein
   if each timeslot comprises 7 symbols, M1 is 3 and M2 is 4, or M1 is 4 and M2 is 3.

7. A data transmission method, comprising:
   sending, by a network device and via a downlink channel, at least one piece of downlink data on a first time domain resource; and receiving, by the network device and via an uplink channel, receiving status information on a second time domain resource, wherein the receiving status information is used to indicate a receiving status of the at least one piece of downlink data; wherein a transmission time interval of an uplink channel carrying the receiving status information is greater than a transmission time interval of a downlink channel carrying any piece of downlink data in the at least one piece of downlink data, the transmission time interval of the downlink channel carrying the any piece of downlink data is less than 1 millisecond, a time interval between the second time domain resource and the first time domain resource is less than 4 milliseconds;

wherein a length of the transmission time interval of the downlink channel carrying the any piece of downlink data in the at least one piece of downlink data is one of 2 symbols and 1 symbol, and the transmission time interval of the uplink channel carrying the receiving status information is 0.5 ms; and the first time domain resource is a timeslot n−2 and the second time domain resource a timeslot n, wherein the timeslot n−2 is a second timeslot counted backward from the timeslot n, each of the timeslots consists of 6 or 7 symbols, and each of the timeslots has a length of 0.5 ms, and the uplink channel is a physical uplink control channel (PUCCH).

8. The method according to claim 7, wherein the transmission time interval of the downlink channel carrying any piece of downlink data in the at least one piece of downlink data is one of 1, 2, 3, and 4 symbols, and the transmission time interval of the uplink channel carrying the receiving status information is one of 0.5 ms and 1 ms.

9. The method according to claim 7, wherein the method further comprises: if the receiving status information indicates that one or more pieces of downlink data in the at least one piece of downlink data fail to be received, retransmitting, by the network device, the one or more pieces of downlink data on a third time domain resource; wherein the third time domain resource is a timeslot n+2 or a timeslot n+3, the timeslot n+2 is a second timeslot counted forward from the timeslot n, and the timeslot n+3 is a third timeslot counted forward from the timeslot n.

10. The method according to claim 7, wherein the transmission time interval of the any piece of downlink data in the at least one piece of downlink data is 0.5 ms, and the transmission time interval of the receiving status information is 1 ms; and the first time domain resource is one of a subframe n−2 and a subframe n−3 and the second time domain resource is a subframe n, wherein the subframe n−2 is a second subframe counted backward from the subframe n, and the subframe n−3 is a third subframe counted backward from the subframe n.

11. The method according to claim 7, wherein before sending, by the network device, the at least one piece of downlink data on the first time domain resource, sending, by the network device, signaling, wherein the signaling indicates at least one of:

a time interval between a second time domain resource and a first time domain resource, a time interval between a second time domain resource and a third time domain resource, and a time interval between a third time domain resource and a first time domain resource.

12. The method according to claim 7, wherein the transmission time interval of PUCCH is 0.5 ms, the PUCCH comprises a first PUCCH and a second PUCCH, and a PUCCH DMRS comprises a first PUCCH DMRS and a second PUCCH DMRS; and the receiving, by the network device, the receiving status information on a second time domain resource comprises:

receiving, by the network device, the first PUCCH and the first PUCCH DMRS in the first M1 symbols of the second time domain resource, wherein the first PUCCH and the first PUCCH DMRS occupy a first frequency domain resource in a frequency domain; and receiving, by the network device, the second PUCCH and the second PUCCH DMRS in the last M2 symbols of the second time domain resource, wherein the second PUCCH and the second PUCCH DMRS occupy a second frequency domain resource in the frequency domain; wherein if each timeslot comprises 7 symbols, M1 is 3 and M2 is 4, or M1 is 4 and M2 is 3.

13. A terminal device, comprising:

a receiver, configured to receive at least one piece of downlink data on a first time domain resource and via a downlink channel; and a transmitter, configured to send receiving status information on a second time domain resource and via an uplink channel, wherein the receiving status information is used to indicate a receiving status of the at least one piece of downlink data, a time interval between the second time domain resource and the first time domain resource is less than 4 milliseconds, a transmission time interval of the uplink channel carrying the receiving status information is greater than a transmission time interval of the downlink channel carrying any piece of downlink data in the at least one piece of downlink data, the transmission time interval of the downlink channel carrying the any piece of downlink data is less than 1 millisecond;

wherein a length of the transmission time interval of the downlink channel carrying the any piece of downlink data in the at least one niece of downlink data is one of 4 symbols and 3 symbols, and the transmission time interval of the uplink channel carrying the receiving status information is 0.5 ms; and the first time domain resource is one of a timeslot n−2 and a timeslot n−3 and the second time domain resource is a timeslot n, wherein the timeslot n−2 is a second timeslot counted backward from the timeslot n, and the timeslot n−3 is a third timeslot counted backward from the timeslot n, each of the timeslots consists of 6 or 7 symbols, and each of the timeslots has a length of 0.5 ms: or a length of the transmission time interval of the downlink channel carrying the any piece of downlink data in the at least one piece of downlink data is 2 symbols or 1 symbol, and the transmission time interval of the uplink channel carrying the receiving status information is 0.5 ms; and the first time domain resource is a timeslot n−2 and the second time domain resource is a timeslot n, each of the timeslots consists of 6 or 7 symbols, and each of the timeslots has a length of 0.5 ms, and the uplink channel is a physical uplink control channel (PUCCH).

14. The terminal device according to claim 13, wherein the transmission time interval of the downlink channel carrying any piece of downlink data in the at least one piece of downlink data is one of 1, 2, 3, and 4 symbols, and the transmission time interval of the uplink channel carrying the receiving status information is one of 0.5 ms and 1 ms.

15. The terminal device according to claim 13, wherein the receiver is further configured to: when one or more pieces of downlink data in the at least one piece of downlink data fail to be received on the first time domain resource, receive the retransmitted one or more pieces of downlink data on a third time domain resource; wherein the third time domain resource is a timeslot n+2 or a timeslot n+3, the timeslot n+2 is a second timeslot counted forward from the timeslot n, and the timeslot n+3 is a third timeslot counted forward from the timeslot n.

16. The terminal device according to claim 13, wherein
before receiving, by the terminal device, the at least one piece of downlink data on the first time domain resource,
receiving, by the terminal device, signaling, wherein the signaling indicates at least one of:
a time interval between a second time domain resource and a first time domain resource,
a time interval between a second time domain resource and a third time domain resource, and
a time interval between a third time domain resource and a first time domain resource.

17. The terminal device according to claim 13, wherein the transmission time interval of the PUCCH is 0.5 ms, the PUCCH comprises a first PUCCH and a second PUCCH, and a PUCCH DMRS comprises a first PUCCH DMRS and a second PUCCH DMRS; and
the transmitter is specifically configured to: send the first PUCCH and the first PUCCH DMRS in the first M1 symbols of the second time domain resource, wherein the first PUCCH and the first PUCCH DMRS occupy a first frequency domain resource in a frequency domain; and send the second PUCCH and the second PUCCH DMRS in the last M2 symbols of the second time domain resource, wherein the second PUCCH and the second PUCCH DMRS occupy a second frequency domain resource in the frequency domain; wherein
if each timeslot comprises 7 symbols, M1 is 3 and M2 is 4, or M1 is 4 and M2 is 3.

\* \* \* \* \*

UNITED STATES PATENT AND TRADEMARK OFFICE
CERTIFICATE OF CORRECTION

PATENT NO. : 10,693,614 B2  
APPLICATION NO. : 16/053266  
DATED : June 23, 2020  
INVENTOR(S) : Li et al.

Page 1 of 1

It is certified that error appears in the above-identified patent and that said Letters Patent is hereby corrected as shown below:

In the Claims

Claim 13, Column 30, Line 46: "niece" should read -- piece --.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*